US005608909A

United States Patent [19]
Atkinson et al.

[11] Patent Number: 5,608,909
[45] Date of Patent: Mar. 4, 1997

[54] METHOD AND SYSTEM FOR CACHING PRESENTATION DATA OF A SOURCE OBJECT IN A PRESENTATION CACHE

[75] Inventors: Robert G. Atkinson, Woodinville; Antony S. Williams, Redmond; Craig Wittenberg, Mercer Island; Srinivasa R. Koppolu; C. Douglas Hodges, both of Redmond, all of Wash.

[73] Assignee: Microsoft Corporation, Redmond, Wash.

[21] Appl. No.: 227,970

[22] Filed: Apr. 15, 1994

[51] Int. Cl.$^6$ .................................................. G06F 9/00
[52] U.S. Cl. ................ 395/703; 395/683; 395/445; 395/705; 364/243.4; 364/280.6; 364/281.3; 364/DIG. 1
[58] Field of Search ................................ 395/800, 700, 395/650, 575, 425, 275, 200, 162, 154, 153, 118, 250, 200.08, 445, 457, 474; 365/189.03, 189.05, 220, 230.01; 364/401, 408, 409, 514

[56] References Cited

U.S. PATENT DOCUMENTS

| | | | |
|---|---|---|---|
| 4,864,516 | 9/1989 | Gaither et al. | 364/518 |
| 5,099,422 | 3/1992 | Foresman et al. | 364/401 |
| 5,287,507 | 2/1994 | Hamilton et al. | 395/650 |
| 5,423,042 | 6/1995 | Jalili et al. | 395/700 |

OTHER PUBLICATIONS

Holzgang, David A., *Understanding PostScript Programming*, Sybex, 434–436, 439–440, 1988.
PostScript®Developer Support Group *Encapsulated PostScript® Files Specification Version 2.0*, 3, 11, 13, 15, Adobe Systems Incorporated, 1989.
Adobe Systems Incorporated, *PostScript® Language Reference Manual, Second Edition*, Addison–Wesley Publishing Co., Inc., 709–736, 1990.
Microsoft Corporation, *Object Linking and Embedding Programmer's Reference, Version 1*, Microsoft Press, 17–21, 148, 149, 172, 173, 178, 202–205, 266, 267, 272–275, 286–289, 392, 393, 1992.
Microsoft Corporation, *Object Linking & Embedding, Extensible Application Protocols*, Microsoft Press, 7–18, 1991.
Programmer's Reference, vol. 1: Overview; Microsoft® Windows™ Version 3.1; Microsoft Corporation; pp. 64–65, 207–210, 218–220; 1992.
Programmer's Reference, vol. 2: Functions; Microsoft® Windows™ Version 3.1; Microsoft Corporation; pp. 264, 337–339, 779, 826–828; 1992.
Bento Specification, Revision 1.0d4; Copyright 1992 Apple Computer; pp. 17, 52–53, 60–61, 73; 1992.

*Primary Examiner*—Alpesh M. Shah
*Attorney, Agent, or Firm*—Seed and Berry LLP

[57] ABSTRACT

A method and system for retrieving and maintaining presentation data in a presentation cache is provided. In a preferred embodiment, a presentation cache object provides a presentation cache with multiple cache entries. Each entry contains an indication of the format of the presentation data and the presentation data stored in that particular format. In addition, other information, such as the advisees of advisory connections for notification of cache updates, can be maintained. The presentation cache object responds to requests for retrieving source object data by returning presentation data cached within the presentation cache when it is available. In addition, the presentation cache object determines when it should delegate requests to the source object and when it can satisfy them on its own. The presentation cache object can return presentation data to a requesting client program even if the server program implementing the source object is unavailable or not running. The presentation cache object can also choose to persistently store its cache entries so that the presentation cache is maintained when the source object is closed. In addition, client programs can provide control over the frequency and subject of presentation data updates within the presentation cache.

44 Claims, 18 Drawing Sheets

VAC1 PROJECT                July 1, 1990

Schedule:

| | WK1 | WK2 | WK3 | WK4 | WK5 | |
|---|---|---|---|---|---|---|
| MODULE2 | | | | | | |
| MODULE1 | | | | | | |
| GLOBAL | | | | | | |

TABLE 1: SCHEDULE

Budget:

| ITEM | EST $ | EXP TO DATE | DELTA | RUNNING |
|---|---|---|---|---|
| SUPPLIES | 100.00 | 50.00 | +50.00 | 50.00 |
| COMPUTERS | 4000.00 | 3895.00 | +195.00 | 3945.00 |
| MANUALS | 500.00 | 500.00 | 0.00 | 4445.00 |
| TOTAL | 5600.00 | 4445.00 | +245.00 | 4445.00 |

TABLE 2: VAC1 BUDGET

*Fig. 1*

Cached Presentation Data

METHOD AND SYSTEM FOR CACHING PRESENTATION DATA OF A SOURCE OBJECT IN A PRESENTATION CACHE

TECHNICAL FIELD

This invention relates generally to a computer method and system for caching presentation data and, more specifically, to a method and system for retrieving and maintaining multiple entries of presentation data in a presentation cache.

BACKGROUND OF THE INVENTION

Some computer system environments allow data from one application to be integrated with data from another application in such a way that all of the data appears to a user to be managed by one application. The data belonging to the application providing a containment environment for all of the data is typically referred to as native data. The containment environment is typically referred to as a container and the application responsible for providing and managing the container is typically referred to as a container application or container program. The data being incorporated into the native data that is generated by and managed using another application is typically referred to as non-native data. Users can embed non-native data within the native data of a container application by inserting the non-native data into the storage structure of the container application. Or, users can link non-native data into the native data of a container application by storing an indicator to the non-native data in the storage facilities of the container application. When embedded or linked, such non-native data is referred to as source data and the program used to manipulate the source data is referred to as the server program. Consequently, the container program is also referred to as a client program because it is a client of the source data maintained by the server program.

For example, a user may wish to create a document using a word processing application containing a chart created by a spreadsheet application. Such a document is sometimes referred to as a compound document. FIG. 1 is an example of a compound document. In this example, the compound document 101 is generated as a report for a certain manufacturing project. The compound document 101 contains scheduling data 102, which is presented in chart format; budgeting data 103, which is presented in spreadsheet format; and explanatory data 104, which is presented in text format. In typical prior systems, a user generates the scheduling data 102 and the budgeting data 103 using a spreadsheet computer program. After this data has been generated, the user creates the compound document 101, enters the explanatory data 104, and incorporates the scheduling data 102 and budgeting data 103 using a word processing computer program. In this example, the explanatory data 104 is native data to the word processing computer program, and the scheduling data 102 and budgeting data 103 is non-native data (source data) contained within a compound document (a container).

Within an environment such as that shown in FIG. 1, where the linking or embedding of non-native data is supported, often times the container program desires to display the non-native data as well as the native data. However, the container program (the client program) does not understand the non-native data because it was created by and is managed by the server program. Thus, in prior systems that use conventional architectures, the non-native data is typically stored by the client program in a presentation format so that it can be displayed by the client program. A presentation format is a format in which the data can be easily displayed on an output device. For example, the presentation format may be a bitmap that can be displayed with a standard bitmap block transfer operation (BITBLT). (For example, in FIG. 1 the scheduling data 102 and budgeting data 103 may be stored by the word processing program as bitmaps, or in other formats, when they are embedded in compound document 101.) Alternatively, if the non-native data is linked by the client program, then the client program typically stores a link to the source data that has been formatted in a format that the client program can treat as a presentation format. In these prior systems, when the client program wishes to display the non-native data using conventional programming style, it renders (places appropriately on a particular output device) the non-native data stored according to the presentation format. Data stored according to a presentation format is sometimes referred to as presentation data.

If the client program desires to display the non-native data in a format different from that which it has stored (or has access to via a link), then the client program can request the data again from the server program but in a different presentation format. For example, a client program may wish the data in another presentation format to print the native and non-native data together in a paginated format. The client program can then render the data in the new presentation format received from the server program. Requesting the data again from the server program requires the server program to be reloaded and re-executed.

Also, in prior systems that support an object-oriented environment, if the non-native data belongs to an object (objects are discussed further below), then the client program typically invokes a function member of the object requesting the object to draw itself in a particular location or context. Note that this latter technique gives the client program little control over how the object renders the object's data.

The present invention is described below using some object-oriented techniques; thus, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes.

A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 2 is a block diagram illustrating typical data structures used to represent an object. An object is composed of instance data (data members) and function members, which implement the behavior of the object. The data structures used to represent an object comprise instance data structure 201, virtual function table 202, and the function members 203, 204, 205. The instance data structure 201 contains a pointer to the virtual function table 202 and contains data members. The virtual function table 202 contains an entry for each virtual function member defined for the object. Each entry contains a reference to the code that implements the corresponding function member. The layout of this sample object conforms to models described in U.S. Pat. No. 5,297,284, entitled "A Method for implementing Virtual Functions and Virtual Bases in a Compiler for an Object Oriented Programming Language," which is hereby incorporated by reference. One skilled in the art would appreciate that other object models can be defined using programming languages other than the C++ programming language.

An advantage of using object-oriented techniques is that these techniques can be used to facilitate the sharing of objects. For example, a program implementing the function members of an instantiated object (the server program) can share the object with another program (the client program). To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). To access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program would need to determine at runtime whether a particular object supports a particular interface. To enable this determination, every object preferably supports the interface IUnknown, which contains a function member, QueryInterface, that indicates which interfaces are implemented for the object. The method QueryInterface is defined as follows:

virtual HRESULT QueryInterface (REFIID iid, void**ppv)=0;

The method QueryInterface is passed an interface identifier in parameter iid (of type REFIID) and returns in parameter ppv a pointer to the implementation of the requested interface of the object for which the method is invoked. If the object does not support the interface, then the method returns an indication that the requested interface is not supported. The type HRESULT indicates a return status predefined by the object-oriented environment.

FIG. 3 is a symbolic representation of an object. In the following description, an object data structure is represented by the shape 301 labeled with the interfaces through which the object may be accessed. As shown, object 301 supports IInterface1 and IInterface2.

SUMMARY OF THE INVENTION

The limitations of prior systems are overcome by the present invention, which is a method and system for retrieving and maintaining presentation data in a presentation cache. In a preferred embodiment, a presentation data cache is provided for caching presentation data of a source object. A program requests that presentation data in a particular format be cached in the presentation cache. This presentation data is then retrieved from a source object and stored in the presentation cache in the requested format. The presentation data previously stored is later retrieved upon request.

In one embodiment of the invention, the presentation data stored in the presentation cache is available even though the server program implementing the source object for the presentation data is unavailable to respond to requests for more presentation data.

In another embodiment, a client program can precisely control which entries in the presentation cache are updated and the frequency of when they are updated.

In another embodiment, presentation data stored in the presentation cache is also stored in the persistent storage of the source object. Methods are available for controlling the frequency and the content of what is stored.

In another embodiment, a client program requests presentation data from a server program that implements a source object. The requested presentation data is cached in a presentation cache such that multiple presentations are available to the client program for rendering the object in different contexts. The client program can further request advisory notification of when the presentation data cached within the presentation cache is updated by the source object.

BRIEF DESCRIPTION OF THE DRAWINGS

FIG. 1 is an example of a compound document.

DETAILED DESCRIPTION OF THE INVENTION

Embodiments of the present invention provide methods and systems for retrieving and managing multiple instances of presentation data in a presentation cache. A presentation cache is a data structure that stores presentation data in particular formats.

Figure 2:
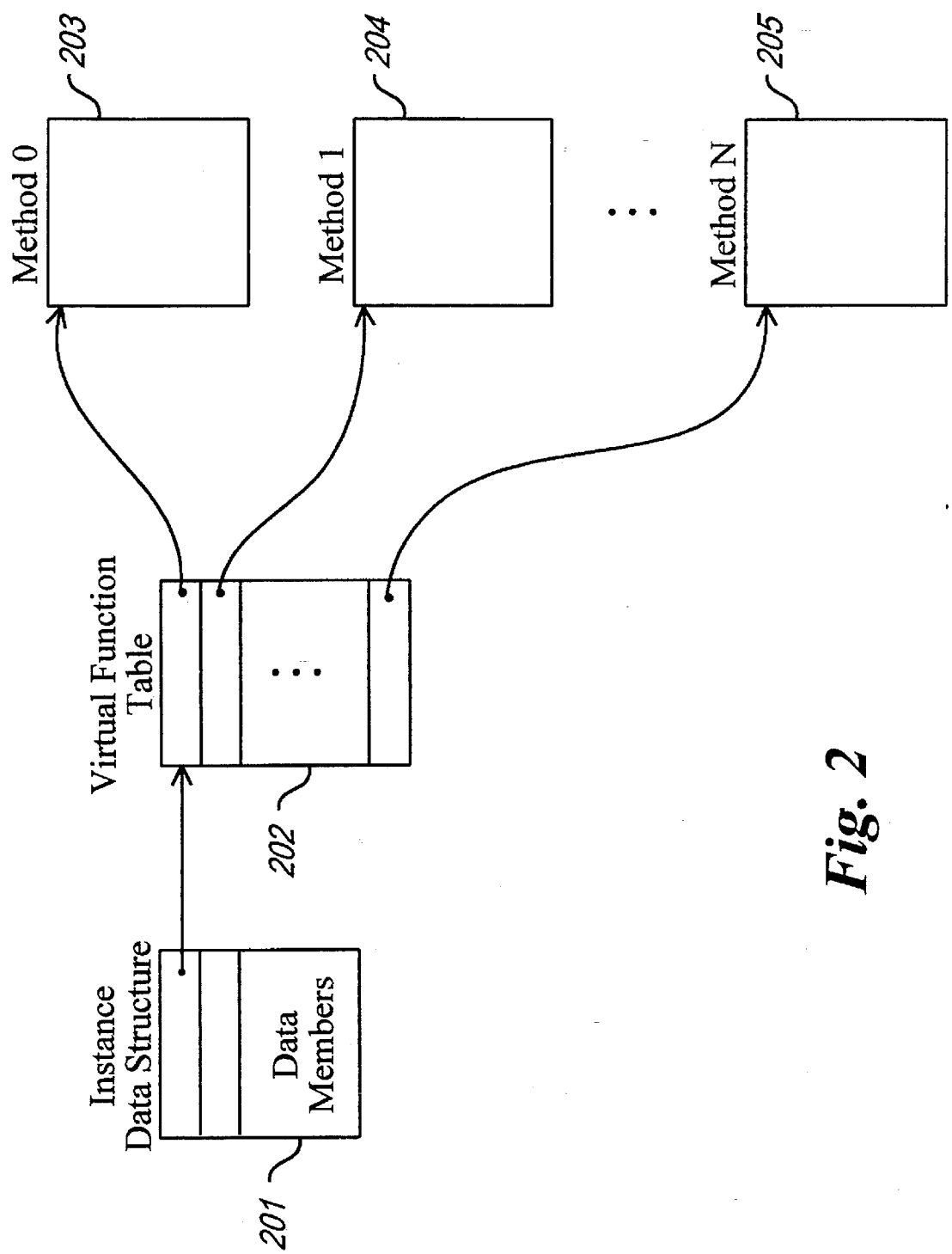
FIG. 2 is a block diagram illustrating typical data structures used to represent an object.
Figure 3:
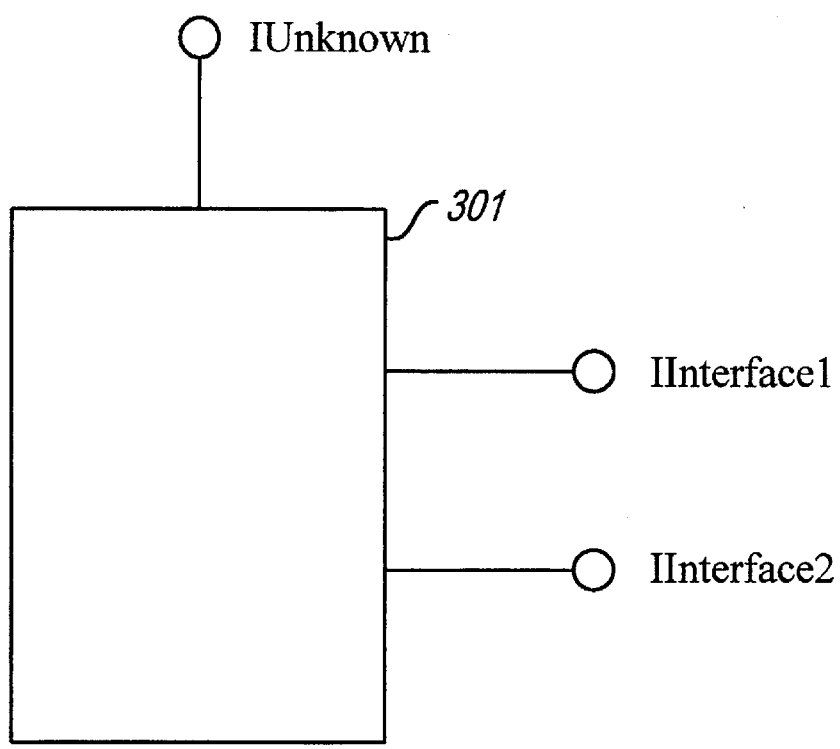
FIG. 3 is a symbolic representation of an object.
Figure 4:
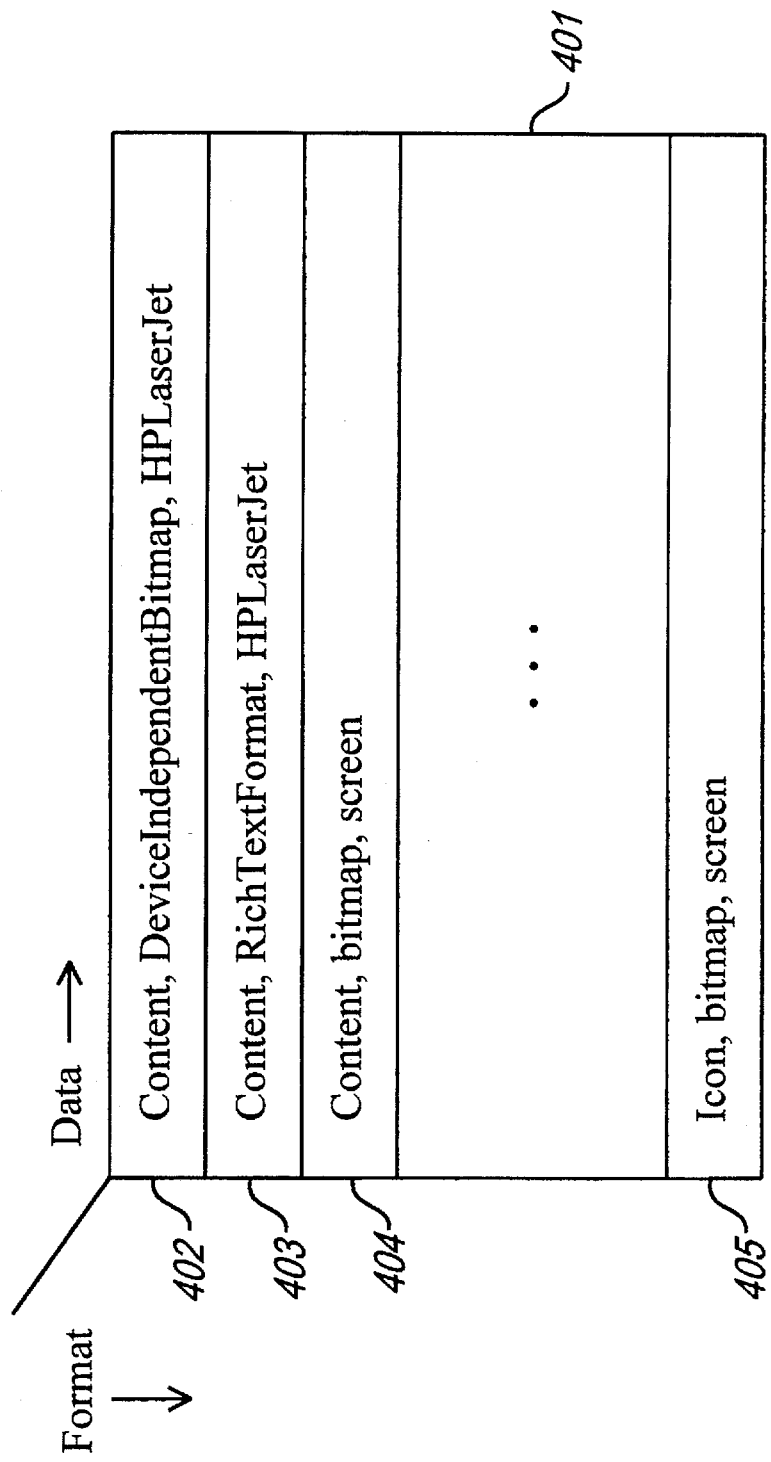
FIG. 4 is a block diagram of a presentation cache.

FIG. 4 is a block diagram of a presentation cache. Presentation cache 401 contains multiple entries of presentation data 402–405 for a particular source object. Each entry in the presentation cache contains data formatted according to a particular presentation format. For example, cache entry 402 contains presentation data representing the content of the source object in a device-independent bitmap ("DIB") format formatted for a type of printer called an HP LaserJet. Cache entry 403 contains presentation data representing the content of the source object in a rich text format formatted for the same printer. Cache entry 404 contains data representing the content of the source object as a bitmap formatted for the display (screen). Cache entry 405 contains data representing an icon belonging to the source object as a bitmap formatted for the screen.

A client program can render the source object data on an appropriate device using the presentation data from any of the cache entries shown in FIG. 4 (or by requesting another presentation format from the source object). The client program may want to render the source object differently based on context. For example, the client program might use cache entry 404 to draw a representation of the source object on the screen (such as the scheduling data 102 shown in FIG. 1). Alternatively, the client program may support rich text format and may wish to paginate the non-native source data with the native data in preparation for printing. In this case, the client program could use cache entry 403 to render the source object on the printer.

The presentation cache for a source object is conceptually part of the source object and is stored with the source object when the cache is stored persistently. Client programs can render source object data by requesting the desired data in a particular presentation format and retrieving the presentation data using a data transfer mechanism provided by the underlying system (e.g., the operating system, a language support environment, the object linking and embedding facilities, or other such similar environments). The client program requests presentation data from the source object through the presentation cache object belonging to the source object. The presentation cache object responds to the client program with the requested presentation data if it can satisfy the request from its cached presentation entries. If not, the presentation cache object requests the data from the source object directly.

In addition to requesting and rendering presentation data, the client program can request that particular formats of presentation data be cached and can request how often particular cache entries are to be updated. The server program and the code implementing the presentation cache object can also control the update frequency of the cache entries. Also, the server program can request the presentation cache object to notify the client program when particular formats of presentation data are changed in the source object.

In these interactions, the presentation cache object acts as an intermediary between the client program implementing the container object and the server program implementing the source object. One advantage of the existence of an intermediary presentation cache object is to enable the client program to receive source object data when the server program is not running. This advantage enables container objects containing embedded or linked source objects (non-native data) to be moved to other computing environments where the server program may not be always available. (Note, however, that the presentation cache object may not be able to keep updated presentation data if the server program is not available.)

In a preferred embodiment, the methods and systems of the present invention are implemented on a computer system comprising a central processing unit, a display, a memory, and input/output devices. The preferred embodiment is designed to operate in an object-oriented environment, such as an environment that supports the Microsoft OLE 2.0 ("OLE") protocol established by Microsoft Corporation in Redmond, Wash. One skilled in the art will also recognize that embodiments of the present invention can be practiced in a non-object-oriented environment as well.

In one aspect of the present invention, a preferred embodiment allows a client program to communicate with (e.g., transfer presentation data to and from) a source object using a presentation cache object. Each server program preferably provides an object handler for each class of source object that the server program implements. The object handler is implemented by object handler code preferably stored as a dynamic link library ("DLL") which is linked as needed into the code execution memory address space of a client program to help the client program communicate with the server program that implements the source object. All communication between the client program and the server program is preferably directed through the object handler code. Thus, in order for a client program to obtain presentation data for an embedded source object, the client program preferably requests and receives presentation data through the object handler corresponding to the embedded source object. The object handler assists the client program by implementing a presentation cache object for caching presentation data of the source object as requested by the client program.

Figure 5A:
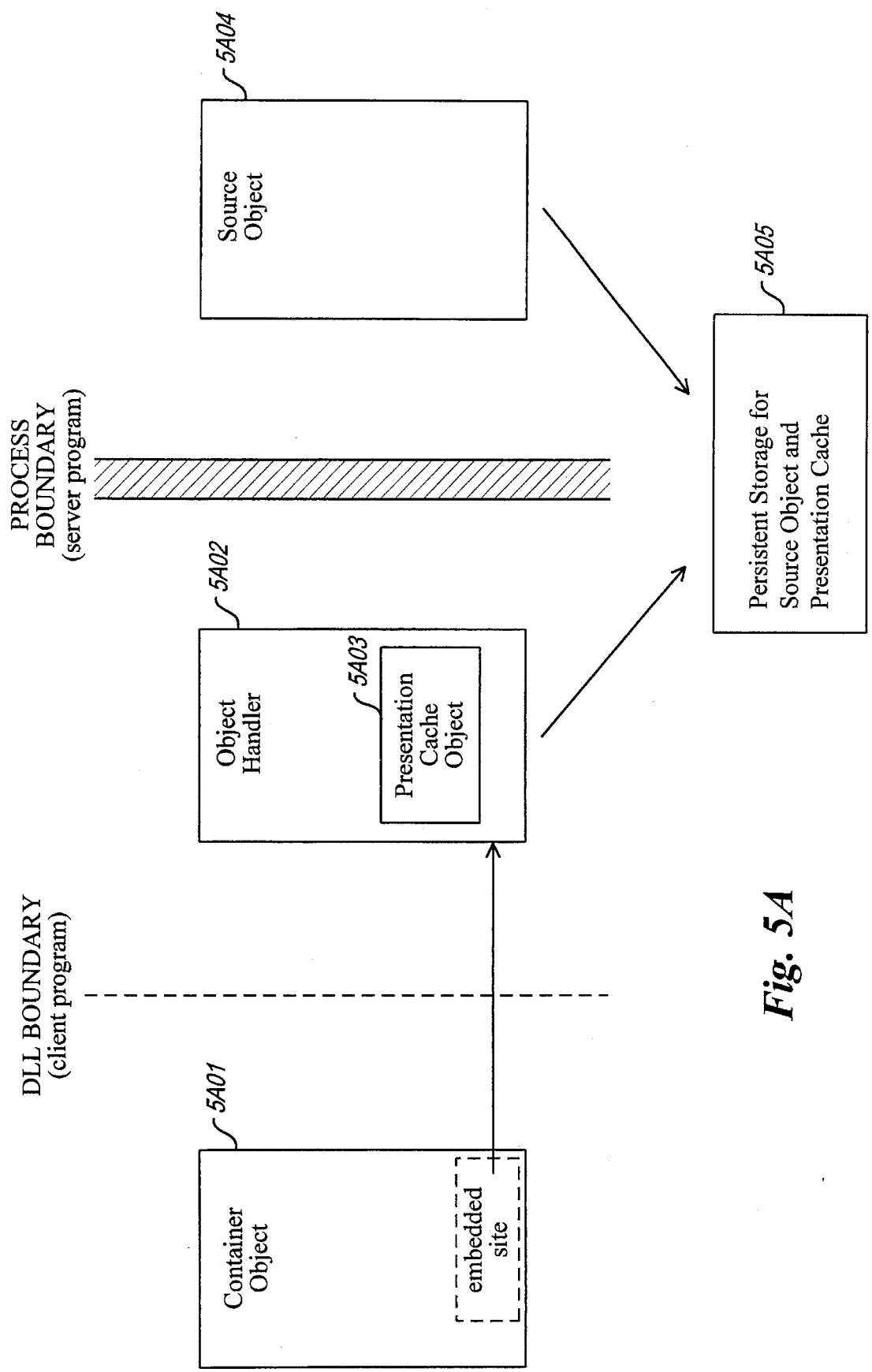
FIG. 5A is a block diagram of an example underlying architecture that supports communication between a client program and a server program for an embedded object using a presentation cache.
Figure 5B:
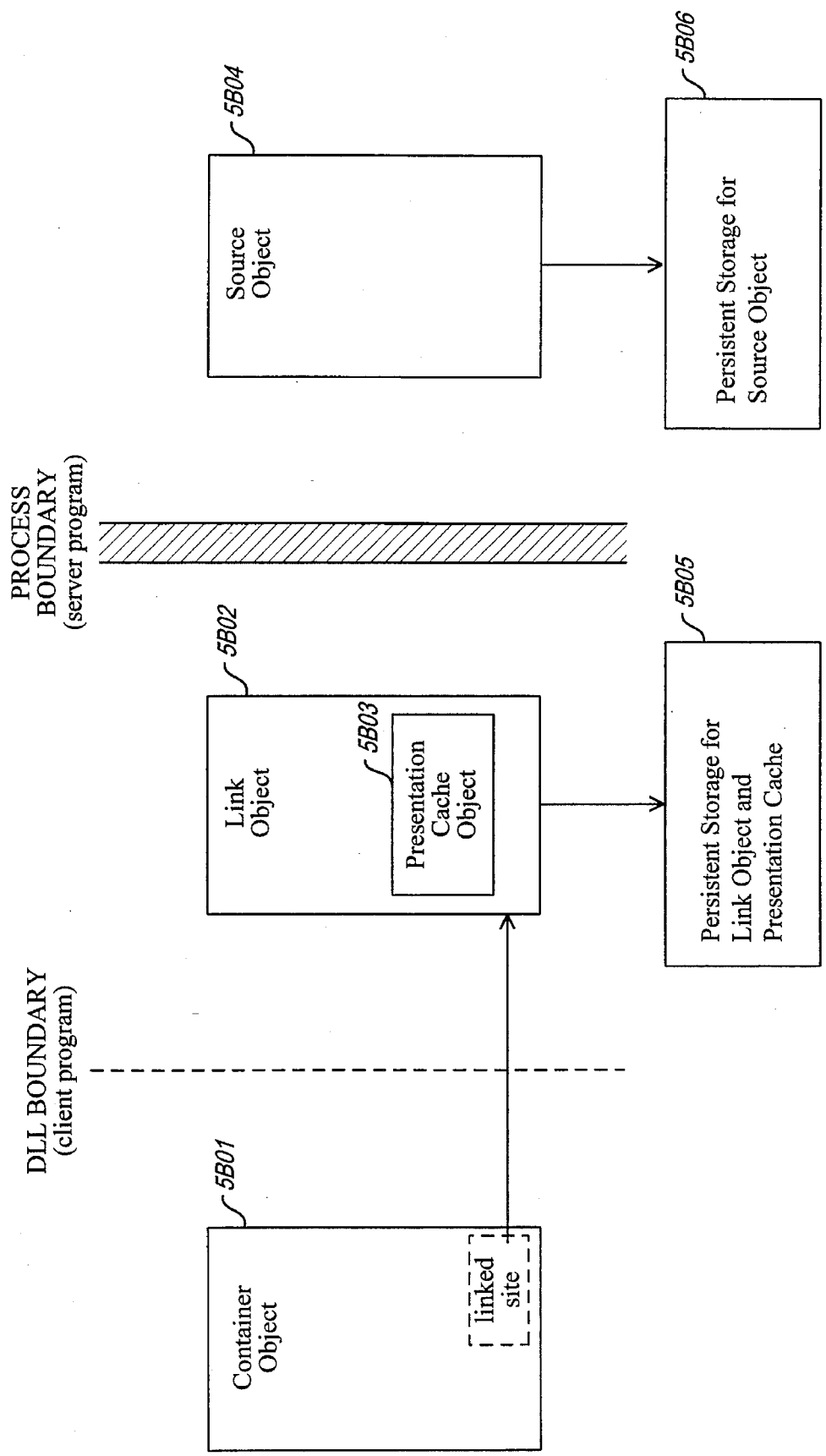
FIG. 5B is a block diagram of an example underlying architecture that supports communication between a client program and a server program for a linked object using a presentation cache.

FIGS. 5A and 5B are block diagrams of an example underlying object-oriented architecture supporting communication between a client program and a server program using a presentation cache object. Using this architecture, a container object implemented by a client program communicates with an embedded or linked source object implemented by a server program through an object handler implemented by object handler code (or through a link object implemented by server code in the case of a linked source object). FIG. 5A is a block diagram of an example underlying architecture that supports communication between a client program and a server program for an embedded object using a presentation cache. FIG. 5B is a block diagram of an example underlying architecture that supports communication between a client program and a server program for a linked object using a presentation cache.

Specifically, in FIG. 5A, container object 5A01 contains an embedded source object stored in persistent storage 5A05. When the container object 5A01 attempts to load the embedded source object from storage 5A05, the code for object handler 5A02 corresponding to the embedded source object is dynamically linked into the code execution address space of the client program that implements container object 5A01. Object handler 5A02 is typically implemented by a DLL provided by the underlying system or by a custom DLL. Once dynamically linked into the code execution address space of the client program, the client program that implements container object 5A01 can communicate with the server program that implements source object 5A04 through the object handler 5A02. The object handler 5A02 can service some client program requests without actually causing the server program to be run. However, if necessary, the server program for the embedded object is executed and the embedded source object is placed in the running state. Source object 5A04 represents the source object in the running state.

In order to dynamically link the object handler DLL into its address space when it loads the embedded object, the client program determines the location of the object handler DLL corresponding to source object 5A04 from the persistent registry. (Recall that each object class has an entry in the persistent registry, based upon the object's CLSID, for maintaining information concerning the location of code supporting the object class and concerning other preferences.) The linking of the object handler DLL is performed by the underlying system automatically when the client program attempts to load the embedded object stored within the persistent storage of container object 5A01.

Once the object handler DLL is linked, the container object 5A01 invokes methods on the object handler 5A02 to request and retrieve presentation data from source object 5A04. In order to facilitate the retrieval and maintenance of such presentation data, object handler 5A02 implements a presentation cache object 5A03. Because the presentation cache object 5A03 is part of the object handler 5A02, the presentation cache 5A03 is conceptually part of the source object. The presentation cache object 5A03 caches (stores) presentation data when it is requested to do so by the client program implementing container object 5A01. Note that the client program need not request that any presentation data be cached within the object handler. Instead, it can request transfers of the presentation data as it needs from the object handler and the object handler will in turn delegate these requests to the source object. One advantage in using the presentation cache object 5A03, is that the object handler DLL, which is linked into the code execution address space of the client program (independent of the state of the server program), can satisfy client program requests for presentation data from presentation cache object 5A03 without executing the server program that implements source object 5A04.

The presentation cache object 5A03 can either cache presentation data in memory or it can also permanently store the presentation data (cache entries) as part of the persistent storage for the source object 5A05. The client program has fine grain control over when the presentation cache 5A03 is updated with new presentation data from the source object 5A04 and over when the information stored in presentation cache 5A03 is stored persistently. In this manner, the client program can control the ability to move the container object 5A01 to other computing environments where the server program implementing source object 5A03 may not be available.

FIG. 5B displays an architecture similar to that shown in FIG. 5A, except that it corresponds to linking a source object within a container document instead of embedding the source object. When a source object is linked into a container object, the container object stores a special object referred to as a link object in the persistent storage for the container object. (In contrast, when a source object is embedded in a container object, the persistent storage of the source object is stored within the persistent storage of the container object.) The source object is persistently stored outside the persistent storage of the container object. The link object stores an indicator to the actual source object so that the actual source object can be accessed when needed. Thus, a link object provides a level of indirection between the container object and the source data supporting the link.

In FIG. 5B, container object 5B01 contains a linked source object stored in persistent storage 5B05. When the container object 5B01 attempts to load the linked source object from storage 5B05, the code for link object 5B02 (corresponding to the linked source object) is dynamically linked into the code execution address space of the client program that implements container object 5B01. Link object 5B02 is implemented by a DLL provided by the underlying system or by a custom DLL. Once dynamically linked into the code execution address space of the client program, the client program that implements container object 5B01 can communicate with the server program that implements source object 5B04 through the link object 5B02.

Link object 5B02 for the purposes of discussing the present invention provides functionality similar to object handler 5A02 discussed with reference to an embedded object. Link object 5B02 can service some client program requests without actually causing the server program corresponding to the linked object to be run. However, if necessary, the server program for the linked object is executed and the linked source object is placed in the running state. Source object 5B04 represents the linked source object in a running state.

The code implementing link object 5B02 is loaded and dynamically linked into the client program code execution address space in an analogous manner to the manner in which object handler DLL 5A02 is loaded and linked into the client program that implements container object 5A01. Specifically, the CLSID for stored link object 5B02 indicates the appropriate DLL to be dynamically linked when the client program loads the linked object from persistent storage 5B05. Once the DLL implementing the linked object is dynamically linked into the code execution address space of the client program, container object 5B01 invokes methods on link object 5B02 to request and retrieve presentation data from source object 5B04.

In order to facilitate the retrieval and maintenance of presentation data, and in a manner similar to object handler 5A02, the code implementing link object 5B02 implements a presentation cache object 5B03. The presentation cache object 5B03 is similar to presentation cache object 5A03. However, when presentation cache object 5B03 desires to permanently store its cached presentation data, it stores the presentation data as part of the persistent storage for link object 5B02 rather than as part of the persistent storage for source object 5B04. Thus, the cached presentation data is stored with the link, not with the data.

Specifically, in FIG. 5B, link object 5B02 can store data cache entries of presentation cache 5B03 in the persistent storage 5B05 for link object 5B02. As can be seen in FIG. 5B, source object 5B04 has its own persistent storage 5B06, which is not referenced directly by link object 5B02. When link object 5B02 desires to communicate with source object 5B04, it causes the server program for the linked source object to be executed and placed in the running state by first binding to source object 5B04 through the source object indicator previously stored within the linked object persistent storage. Link object 5B02 then requests the binding mechanism to place the object in a running state. In a typical embodiment, the binding mechanism is provided by the underlying system. For example, a binding mechanism referred to as "Monikers" is discussed in detail in the reference "OLE2 Programmer's Reference," Volume 1, Microsoft Corp., 1994 (hereinafter referred to as the "OLE2 Programmer's Reference"). In contrast, an embedded object can directly request its corresponding server program to execute because it contains the information required to do so in its persistent storage.

For the purposes of caching presentation data, the architectures supporting linked versus embedded objects are similar. Thus, the remainder of this description refers primarily to embedded objects. One skilled in the art will appreciate that the description of the preferred embodiment applies to both embedded and linked objects.

Generally speaking, when a client program wishes to display an object, it can do so in three ways. First, the client program can ask the source object to draw itself in a particular context. The object provides a draw method (e.g., the IViewObject::Draw method) in order to support this mechanism. Second, the client program can request the presentation data for the source object in a particular format and render the presentation data. In a typical environment, the object provides a data transfer retrieval method (e.g., the IDataObject::GetData method) to retrieve the presentation data from the source object. Third, a client program can request the object handler to cache presentation data in a presentation format, selected by either the server program or the client program, and can retrieve the cached data and render the data immediately or at a later time (e.g., using the IOleCache::Cache and IDataObject::GetData methods discussed below). Embodiments of the present invention are primarily concerned with supporting this third mechanism.

In a preferred embodiment, the underlying system provides a data transfer mechanism for sending data and getting data to and from objects. Preferably, an IDataObject interface is defined for sending and receiving data that can be rendered whenever the invoking object desires. Preferably an IViewObject interface is defined that contains a Draw method and that can be invoked by a client program to ask the object to draw itself. These data transfer interfaces are typically defined by the underlying object-oriented environment and are discussed in detail in the OLE2 Programmer's Reference. The methods of these interfaces are discussed in detail only as they provide support for or are involved in rendering source object data using presentation formats.

One of the methods provided by the IDataObject interface is the DAdvise method. The IViewObject interface provides a related method, SetAdvise. These methods are used in conjunction with the IAdviseSink interface to set up an advisory connection between two objects. An advisory connection is a connection that exists between two objects such that one object can notify a second object by invoking a method of the second object. Specifically, the DAdvise and SetAdvise methods are called by a client program in order to request a server program to tell the client program when particular data changes. The client program provides a callback routine (which is typically a method of the IAdviseSink interface such as the OnDataChange method) to the source object when the client program invokes the DAdvise or SetAdvise method. Later, when the data changes, the source object invokes the callback method previously provided to let the client program know that data has changed.

With respect to rendering presentation data, two callback routines are used depending upon whether the advisory connection is set up using the DAdvise or SetAdvise method. The (callback) method OnDataChange is invoked by the server program when the presentation data that corresponds to the presentation format requested in the DAdvise connection setup changes. Analogously, the (callback) method OnViewChange is invoked by the server program when the presentation data that corresponds to the advisory connection requested using the IViewObject::SetAdvise method changes. This might happen, for example, if the server program decided to update the data it would normally use to draw itself when requested using the method IViewObject::Draw.

Figure 6:
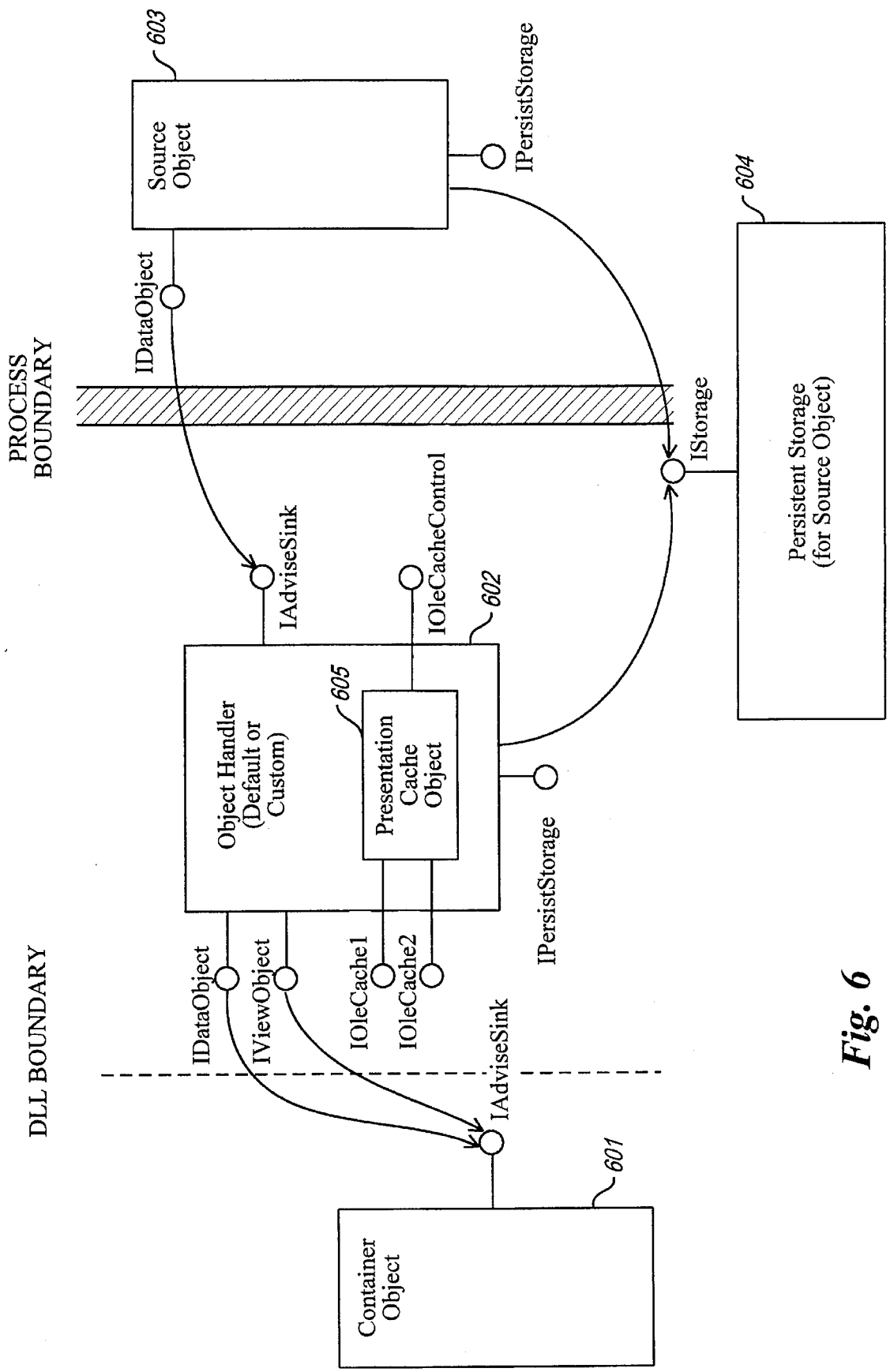
FIG. 6 is a block diagram of the typical interfaces used by a client program to communicate with a server program in order to render source object presentation data.

FIG. 6 is a block diagram of the typical interfaces used by a client program to communicate with a server program in order to render source object presentation data. FIG. 6 shows a container object 601 connected to an object handler 602 and a source object 603 using these underlying data transfer mechanism interfaces. The object handler contains a presentation cache object 605 and has access to the persistent storage 604 of source object 603. As can be seen in the figure, the object handler 602 supports both the IDataObject interface and the IViewObject interface. When the container object desires to get or set presentation data or to set up an advisory connection with the source object to be notified when presentation data changes, the client program invokes the appropriate methods of the IDataObject and IViewObject interfaces of object handler 602. If an advisory connection is set up (either for a presentation format requested by the client program or for one determined by the server program), the client program passes the IAdviseSink interface of container object 601 to the DAdvise or SetAdvise methods of the IDataObject or IViewObject interfaces, respectively, of object handler 602. In response to the invocation of methods of the IDataObject and IViewObject interfaces, object handler 602 consults its own presentation cache object 605 to determine whether it can satisfy the client program request, and then delegates the request, if appropriate, to the server program that implements source object 603.

In order to support this communication between the object handler 602 and the server program that implements the source object 603, an advisory connection is established between them using the IDataObject interface of source object 603. The object handler invokes the IDataObject::DAdvise method of source object 603 passing an indicator to its IAdviseSink interface. The server program implementing object 603 can then invoke the OnDataChange method of the IAdviseSink interface of object handler 602 when data within the source object changes. The object handler can then relay these changes to the client program that implements container object 601 through the advisory connections already established as described.

Although not shown in FIG. 6, the object handler is also preferably responsible for the remoting code used to communicate between the client program and the source program when they are implemented as separate processes. Note that a source object may be implemented as server code that runs entirely in the code execution address space of a client program. In this case, the server code is typically implemented as a server DLL. The server DLL preferably encompasses object handler functionality. Because there is no server program existing outside of the client program in this case, no remoting code is necessary.

FIG. 6 also shows the interfaces supported by the presentation cache object 605. These interfaces include IOleCache, IOleCache2, and IOleCacheControl. These interfaces (discussed in detail below) are the interfaces primarily responsible for providing support for the presentation cache. The IOleCache interface provides methods for specifying what presentation data should be cached or uncached and for initializing cache entries. The IOleCache2 interface enables a client program to control updating cache entries. The IOleCacheControl interface is an interface used between an object handler and a source object to enable the source object to inform the object handler when it transitions in and out of a running state. (The running state of an object corresponds to a state where the server application is executing and can respond to method invocation.)

FIG. 6 also shows the persistent storage 604 for source object 603. The persistent storage 604 supports the IStorage interface, which is accessed by the IPersistStorage interfaces supported by the object handler 602 and the source object 603. The persistent storage 604 supports the storage of the presentation data of a source object as required by the object handler 602 or as requested by the client program implementing container object 601. The storage of presentation cache entries is discussed in detail below.

The following sections provide a detailed discussion of the structures and mechanisms provided by a preferred embodiment to implement and manage a presentation cache for rendering object presentation data.

Multiple Presentation Format Support

As can be seen in FIG. 4, a number of characteristics are used to describe the presentation data cached within a presentation cache object. These characteristics are preferably stored in a data structure referred to as the FORMATETC structure. The FORMATETC structure is used by the methods involved in caching and rendering object presentation data. Typically, the FORMATETC structure is used to request or define the data format and aspect ("characteristics") of the presentation format being requested or transferred, as well as other information. A preferred FORMATETC structure is shown in Table 1. (All pseudocode is described in the style of the C++ programming language.) One skilled in the art will appreciate that the entries in the structure could vary.

TABLE 1

```
typedef struct tagFORMATETC {
    CLIPFORMAT         cfFormat;
    DVTARGETDEVICE     ptd;
    DWORD              dwAspect;
    LONG               lindex;
    DWORD              tymed;
}FORMATETC;
```

The cfFormat member of the FORMATETC structure describes the data format of the presentation data being requested or transferred. The ptd member specifies the destination device for transferring the presentation data (e.g., a printer). The dwAspect member allows a client program to request different parts of the data from an object. The lindex member further parameterizes the dwAspect member. The tymed member indicates the type of medium to be used for transferring the presentation data.

More specifically, the dwAspect member requests a particular aspect of the object data. An aspect defines a representation of an object. An object can have many representations such as a browsing representation, which is appropriate for viewing only, or a print representation in which the data is formatted for printing. Therefore, by appropriately setting the dwAspect member of the FORMATETC structure, a client program may request a particular part of the object data. In a preferred embodiment, there are preferably at least four values appropriate for the dwAspect member: DVASPECT_CONTENT, DVASPECT_THUMBNAIL, DVASPECT_ICON, and DVASPECT_DOCPRINT. The DVASPECT_CONTENT value signifies a request for a representation of the object appropriate for displaying the object. The DVASPECT_THUMBNAIL value signifies a request for a representation of the object suitable for browsing. The DVASPECT_ICON value signifies a request for an iconic representation of the object. The DVASPECT_DOCPRINT value signifies a request for a printed representation of the object (i.e., formatted as a sequence of pages). One skilled in the art will recognize that the number and type of values can vary.

The lindex member is interpreted based upon the current value of the dwAspect member. When the value of dwAspect is DVASPECT_CONTENT, lindex is preferably a −1. When the value of dwAspect is DVASPECT_DOCPRINT, lindex indicates a range of pages in the printed representation of the object. Otherwise, lindex is ignored.

As stated, the tymed member indicates the type of medium for transferring the presentation data. The values for the tymed member correspond to bit positions, thus a client can request any combination of the appropriate values by combining the values using a logical "OR" Boolean operation. The values for the tymed member thus enable a client program to request data transfer over one of a number of media. Typical values for the tymed member are listed in Table 2.

TABLE 2

| Value | Description |
| --- | --- |
| TYMED_HGLOBAL | Indicates that the client requests the transfer medium to be global memory. |
| TYMED_FILE | Indicates that the client requests the transfer medium to be a file on the permanent storage device. |
| TYMED_ISTREAM | Indicates that the client requests the transfer medium to be a stream object. A stream object is an object that supports the IStream interface and that can be used to store a continuous series of bytes. |
| TYMED_ISTORAGE | Indicates that the client requests the data to be transferred through the use of a storage object. A storage object is an object that supports the IStorage interface. A storage object does not contain data, but refers to other storage and stream objects. The storage objects combine to form a hierarchy, similar to a directory tree on typical permanent storage devices. Just as a subdirectory can point to other subdirectories or files, a storage object can point to other storage and stream objects. |
| TYMED_GDI | Indicates that the client requests the transfer medium to be a graphic data interface object (GDI). A GDI object is an object of graphical data formatted for a graphical display device, such as a computer display or printer. Access to the data in the GDI object is provided through a graphical data interface which manipulates the graphical data on the device. An example of a graphical data interface is provided in the Windows operating system sold by Microsoft Corporation of Redmond, Washington. |
| TYMED_MFPICT | Indicates that the client requests the transfer medium to be a metafile. A metafile is a file containing pictorial information in the form of a script with data. Each entry in the script is a reference to a graphic data interface routine for manipulating the pictorial information on a graphic device. |

Presentation Cache Support

As described earlier, a client program can display objects either by asking the object to draw itself, requesting presentation data and rendering it, or by caching presentation data in a presentation format and then rendering the presentation data at its convenience. Recall also that because the presentation cache is implemented by a presentation cache object within the object handler (which resides in the code execution address space of the client program), the client program can access the presentation data stored within the presentation cache even though the server program implementing the source object is not available or is not running.

Consequently, there are two basic styles for presentation cache usage by a client program. First, the client program can set up the presentation cache and the advisory connections it desires for particular presentation formats so that it can be notified by the object handler when the associated data changes within the source object. Alternatively, the client program can request the object handler to cache data in particular presentation formats, but not request any notification when the associated data changes. Depending upon the request and whether or not the server application is running, the presentation cache entry will be filled at various times. If the client program has not requested any advisory connections, then the client program is not notified of any data changes. However, the client program can explicitly request presentation data preferably at any time and then render it.

As discussed with reference to FIG. 6, several interfaces are supported by a presentation cache object in order to provide the capability to retrieve, cache, and maintain presentation data. These interfaces include the IOleCache interface, the IOleCache2 interface, and the IOleCacheControl interface. Each of these interfaces is discussed in turn. Also, the object handler provides support through its IDataObject and IViewObject interfaces for retrieving and accessing presentation data from the presentation cache. The methods related to these functions as implemented by a typical object handler are discussed. In addition, a description of the storage of the presentation cache and control of cache updates follows the description of these interfaces.

IOleCache Interface

The IOleCache interface is used to provide control of what presentation data is actually cached inside an embedded source object (or inside a link object that references a linked source object) and what will therefore be available to a client program even when the server program implementing the source object is either not running or simply not available. Table 3 lists a preferred IOleCache interface. Each method is described in detail following the table.

TABLE 3

```
interface IOleCache: IUnknown {
    virtual   HRESULT   Cache(LPFORMATETC pformatetc,
                              DWORD grfAdvf, LPDWORD
                              *pdwConnection) = 0;
    virtual   HRESULT   Uncache(DWORD dwConnection) =
                              0;
    virtual   HRESULT   EnumCache(LPENUMSTATDATA
                              *ppenumStatData) = 0;
    virtual   HRESULT   InitCache(LPDATAOBJECT
                              pDataObj) = 0;
    virtual   HRESULT   SetData(LPFORMATETC pformatetc,
                              STGMEDIUM FAR *pmedium,
                              BOOL fRelease) = 0;
};
```

IOleCache::Cache

The Cache method indicates that the presentation data described by the designated formatetc should be cached. The parameter pformatetc indicates the specific presentation data to cache. The parameter pformatetc can specify either data or view caching; the latter is indicated by passing a zero data format: pformatetc—>cfFormat=0. (With view caching, the source object itself, through the object handler, decides what formats to cache in order to handle a future client program request to draw.) The pdwConnection parameter indicates a returned token value that can be used with IOleCache::Uncache( ) to turn off the caching of specific presentation data. The grfAdvf parameter contains a group of flags indicating when the cache should be filled or updated with presentation data. Preferred values for the grfAdf flags include the following:

ADVF_NODATA,
ADVF_ONLYONCE,
ADVF_PRIMEFIRST,
ADVFCACHE_NOHANDLER,
ADVFCACHE_FORCEBUILTIN, and
ADVFCACHE_ONSAVE.

The ADVF_NODATA flag is used to indicate that the cache should not be filled by changes in the object (data should not be passed between the source object and the object handler when the source object data changes). Rather, the client program fills the cache by making explicit IOleCache::SetData calls to fill in data. The ADVF_ONLYONCE flag indicates that the cache is to be updated one time only, upon receipt of the first OnDataChange notification from the source object. After this update is complete, the advisory connection between the source object and the presentation cache (through the object handler) is disconnected. The ADVF_PRIMEFIRST flag indicates that the cache is to be filled immediately, not waiting for the first time that the data changes. If the object is not currently running, the cache is in fact filled the first time that the running state is entered. Note that the combination of ADVF_ONLYONCE| ADVF_PRIMEFIRST provides, in effect, an asynchronous cache update because the cache is filled in response to invoking this method and then is not updated subsequently (unless update control is modified or an explicit update is requested). The ADVFCACHE_NOHANDLER flag is reserved for future use. The ADVFCACHE_FORCEBUILTIN flag is used to indicate that the presentation cache object needs to explicitly cache the requested presentation data in persistent storage (even if the presentation cache doesn't normally actually persistently cache the data) to ensure that the presentation data can be retrieved by the client program even when the server program or any customized handler code is not available. Because the stored presentation cache can preferably always be read by an underlying system supplied default handler, once the data has been forcefully cached, the client program is ensured that it can access presentation data using only the underlying system. The ADVFCACHE_ONSAVE flag is used to indicate that the cached presentation data should be updated when the source object containing the presentation cache is saved. (The cache is also updated when the source object transitions from the running state back to the loaded state because a subsequent save operation would require rerunning the object.)

Figure 7:
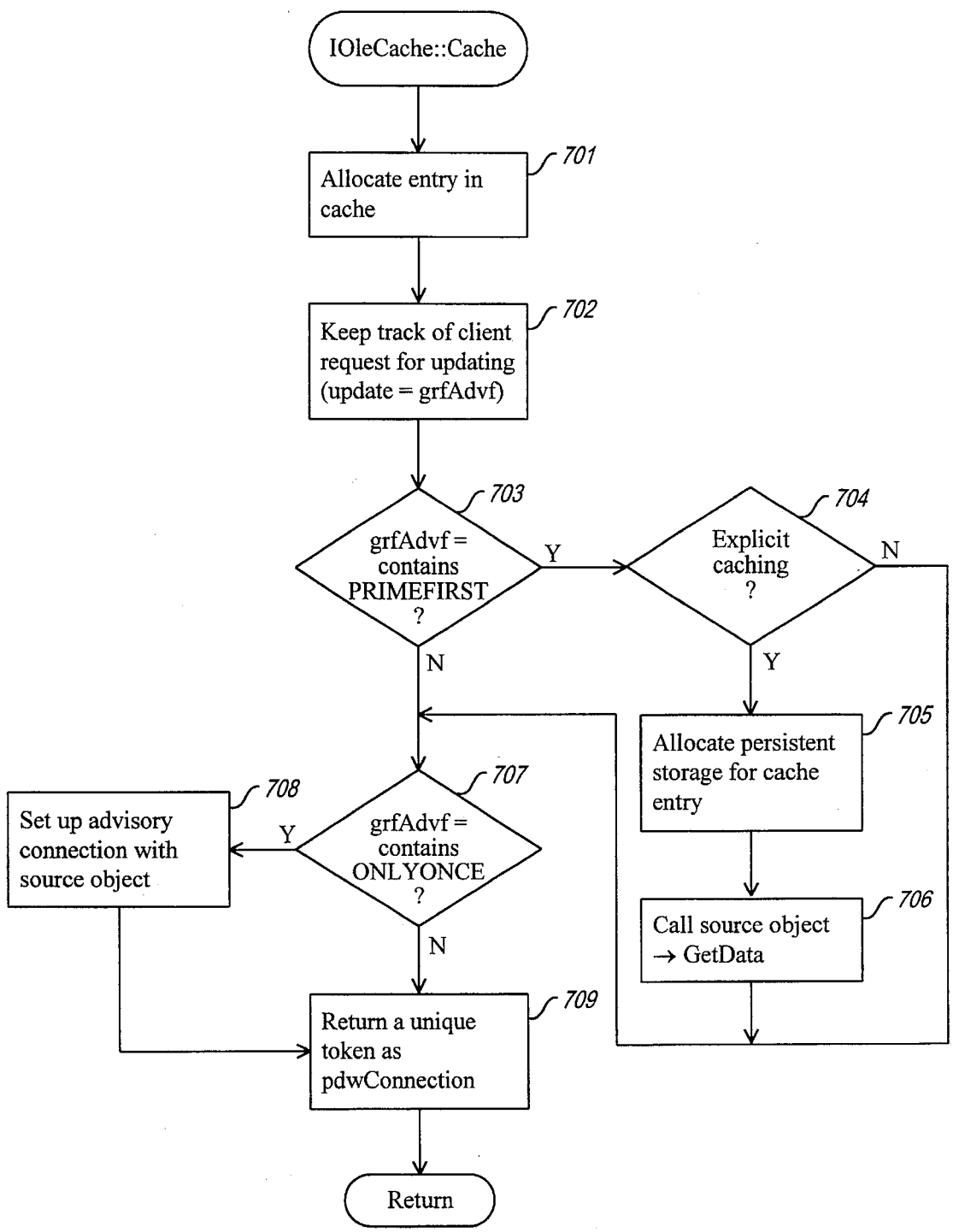
FIG. 7 is an overview flow diagram of a typical object handler implementation of the IOleCache::Cache method.

FIG. 7 is an overview flow diagram of a typical object handler implementation of the IOleCache::Cache method. The method allocates an appropriate entry in a presentation cache data structure (such as a multidimensional array), keeps track of the client program's updating requests, and fills the cache entry with presentation data if appropriate. In step 701, the method allocates an entry in the data structure used to represent the contents of the presentation cache. Typical conventional data structures such as an array can be used for this purpose. One possible data structure is discussed with reference to FIG. 8 below. In step 702, the method records the update flags indicated in the grfAdvf parameter in order to keep track of the client program preferences for updating the cache entry. Note that each cache entry can be updated using a different scheme, thus allowing a finer degree of control. In step 703, the method determines whether the ADVF_PRIMEFIRST update flag is specified and, if so, continues in step 704, else continues in step 707. In step 704, the method determines whether the object handler uses explicit caching. If so, the method continues in step 705 to fill the presentation cache entry, else continues in step 707.

Explicit caching means that the handler has been requested to physically cache the presentation data and to save it with the object storage in order to satisfy client program requests to render an object. Implicit caching, on the other hand, means that the object handler directly supports the presentation data formats that can be requested by a client program and therefore does not need to explicitly store the data in these data formats in persistent storage or in memory. Implicit caching typically occurs when a server program provides a custom object handler that knows how to access and manipulate the source object presentation data directly from persistent storage. The custom object handler in this case directly accesses the IStorage of the object. Note that a client program can insist upon explicit caching by specifying the ADVFCACHE_FORCEBUILTIN flag in the grfAdvf parameter to this method. If explicit caching is being performed by the object handler, then in step 705, the method allocates persistent storage for the cache entry. In step 706, the method gets the presentation data corresponding to the requested presentation format from the source object by invoking the IDataObject::GetData method of the source object.

In step 707, the method determines whether the ADF_ONLYONCE update flag was requested by the client and, if so, continues in step 708, else continues in step 709. In step 708, the method sets up an advisory connection with the source object for the client requested data presentation data format and continues in step 709. When the ADVF_ONLYONCE flag is specified by the client program, the cache is updated once when the object handler is notified of the corresponding data change by the source object (through, for example, the object handler's IAdviseSink interface). Thus, for the object handler to fill this cache entry, the object handler needs to set up an advisory connection with the source object as shown in step 708 to receive the data change notification from the source object (e.g., using the method OnDataChange). In step 709, the method returns a unique token associated with this particular presentation cache entry, and returns.

Figure 8:
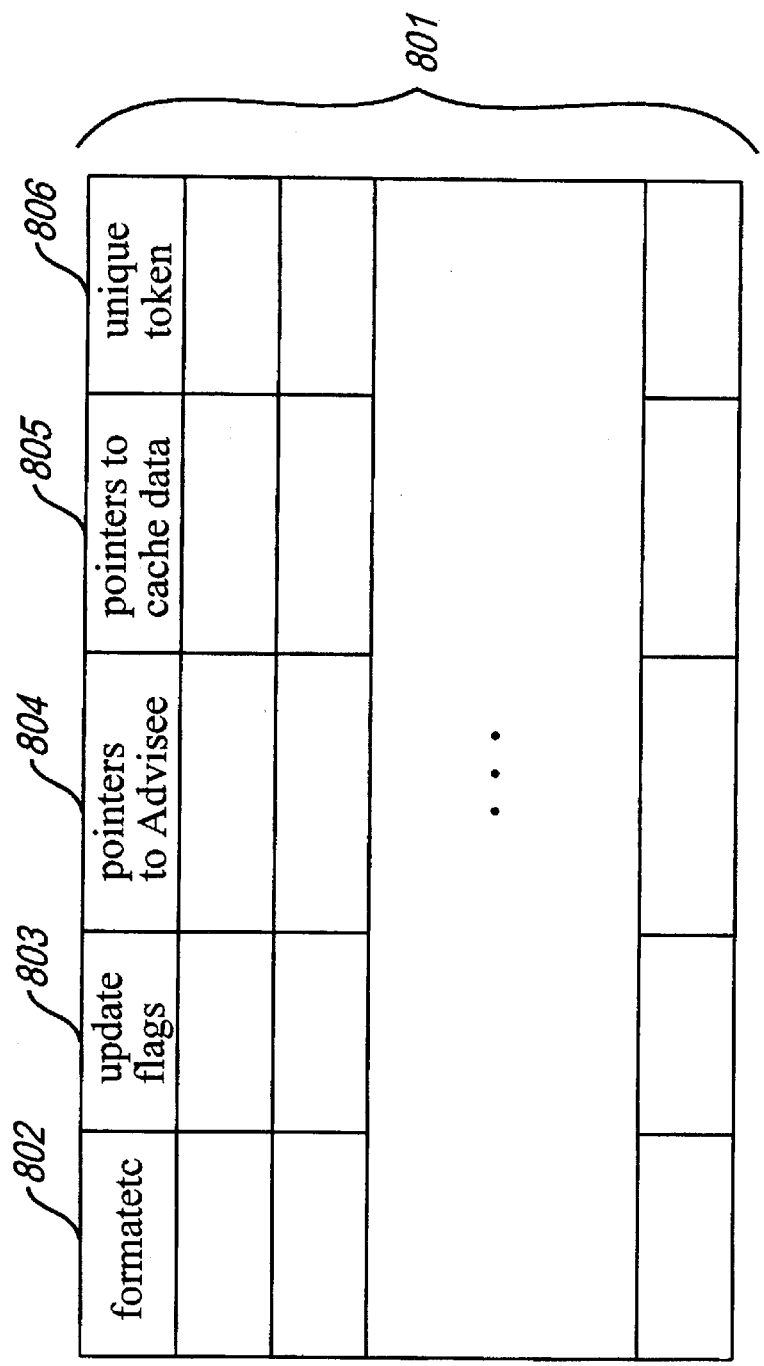
FIG. 8 is a block diagram of an example data structure for storing presentation cache information.

FIG. 8 is a block diagram of an example data structure for storing presentation cache information. Table 801 contains an entry (a row) for each format of presentation data a client program requests to cache. Each presentation cache entry contains five fields. The first field 802 contains the format information for that presentation data entry, for example, as requested in the FORMATETC parameter passed to the method IOleCache::Cache. The second field 803 contains the update flags, for example, as reflected in the parameter grfAdvf passed to the IOleCache::Cache method. The third field 804 contains a pointer to an advisee object if an advisory connection has been established between the client program and the object handler (e.g., an IAdviseSink interface). The fourth field 805 contains a pointer to the actual cached presentation data if it is stored in persistent storage. The fifth field 806 contains a unique token identifying this presentation cache entry. One skilled in the art will recognize that many alternatives to this data structure are possible for storing the information needed for a presentation cache object. Also, the number of fields and the content of the fields can vary for implementations. For example, if the data structure is stored as an array, the unique token field 806 is typically unnecessary. Also, the field 805, which points to the persistently cached data, is typically unnecessary as the presentation cache object can search through the persistent storage of the source object by name for the appropriate entry.

IOleCache::Uncache

The Uncache method removes a cache entry, and any of its associated data connections, as previously set up with IOleCache::Cache. The method has a single parameter, dwConnection, which is a unique token identifying a previously set up presentation cache entry. This parameter value was returned through the pdwConnection parameter in a prior IOleCache::Cache call. If this value does not actually indicate a valid connection, then an error is returned.

Figure 9:
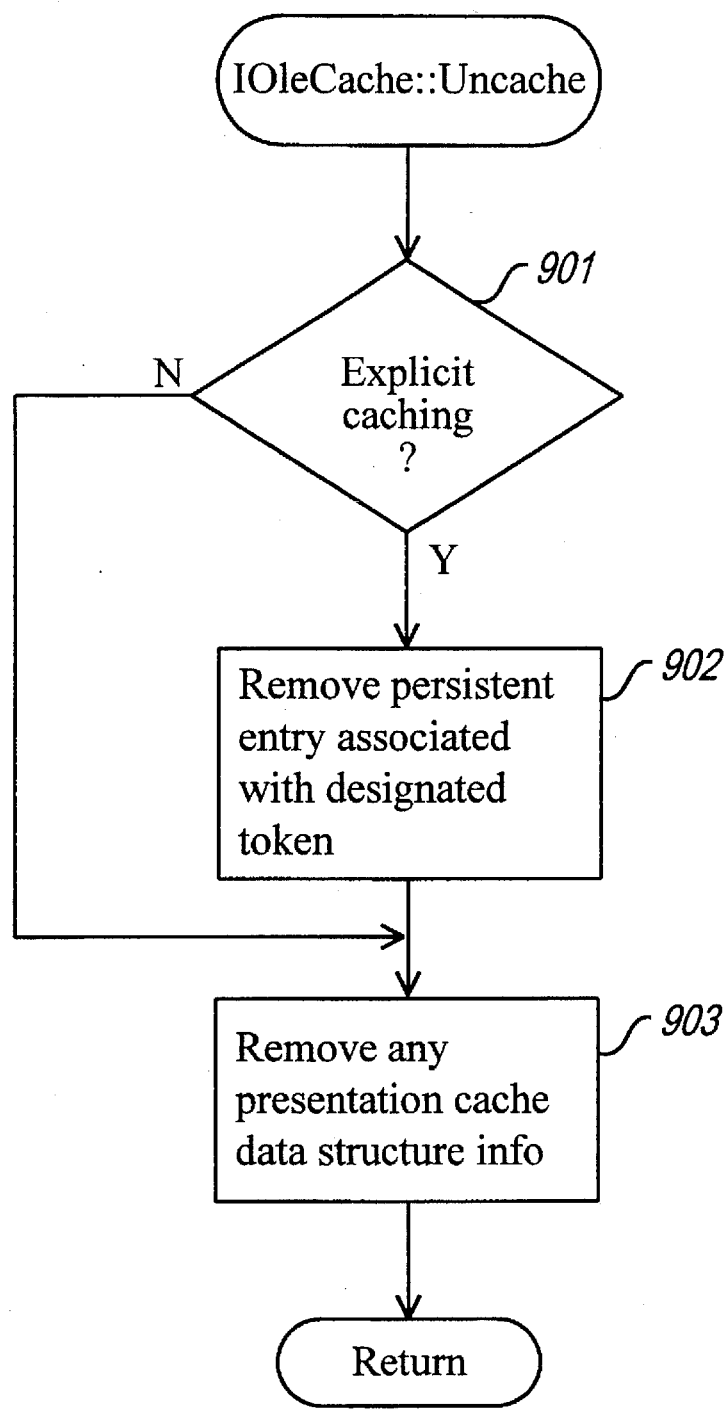
FIG. 9 is an overview flow diagram of a typical object handler implementation of the IOleCache::Uncache method.

FIG. 9 is an overview flow diagram of a typical object handler implementation of the IOleCache::Uncache method. In step 901, the method determines whether explicit caching is required and, if so, continues in step 902, else continues in step 903. In step 902, the method removes the entry associated with the designated token (dwConnection) stored persistently in persistent storage. In step 903, the method removes any data structure information associated with the presentation cache entry in memory for the designated token, and returns.

IOleCache::EnumCache

The EnumCache method returns an enumerator interface implementation (an instance of an enumerator class) that can enumerate the cache entries presently established. The implementation of this method is dependent upon the data structure used to store the presentation cache. Preferably, enumerators provide methods to return the contents of the next item and to reset to the beginning of the data structure. For example, the enumerator returned would typically enumerate each field in the presentation cache data structure shown in FIG. 8.

IOleCache::InitCache

The InitCache method fills the presentation cache as needed from data available from a designated data object. The method has one parameter: a pointer to the IDataObject interface of an object. This method is typically used in the process of creating an object from the clipboard or through a drag-drop operation. The purpose of this method is to fill the presentation cache in the embedded object from other data formats provided on the clipboard or in the drop operation.

Figure 10:
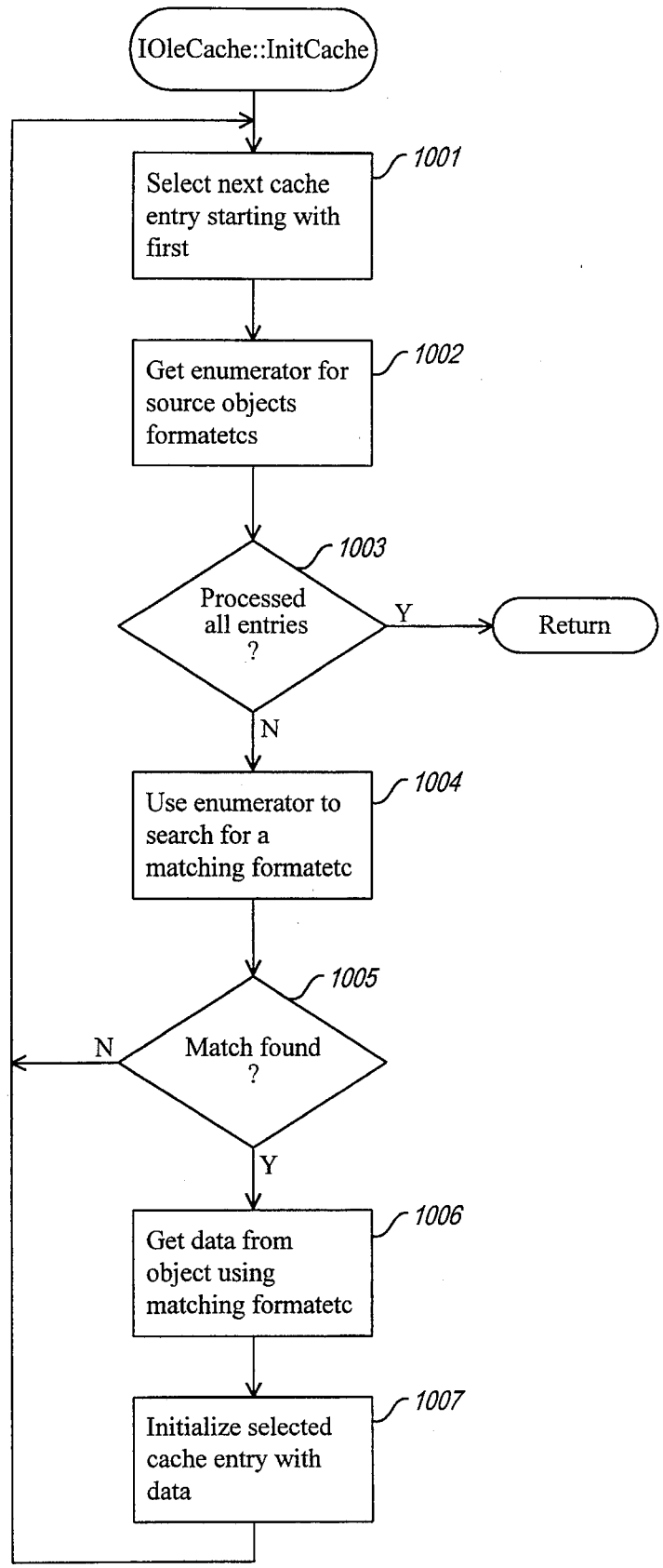
FIG. 10 is a flow diagram of a typical object handler implementation of the IOleCache::InitCache method.

FIG. 10 is a flow diagram of a typical object handler implementation of the IOleCache::InitCache method. The method essentially compares the formatetc of each presentation cache entry with the available formatetcs in the designated object, and when it finds a match the method fills the corresponding cache entry. In step 1001, the method selects the next cache entry in the presentation cache data structure starting with the first entry. In step 1002, the method gets the enumerator for the designated object for enumerating its formatetcs (e.g., IDataObject::EnumFormatEtc). In step 1003, the method determines whether all entries in the presentation cache have been processed and if so returns, else continues in step 1004. In step 1004, the method searches the designated object (in a loop) using the retrieved enumerator for a formatetc supported by the designated object that matches the formatetc of the selected presentation cache entry. In step 1005, if a match has been found, the method continues in step 1006, else the method continues with the next presentation cache entry in step 1001. In step 1006, when a match is found, the method retrieves the presentation data from the designated object corresponding to the matching formatetc (e.g., by invoking IDataObject::GetData with the matching formatetc). In step 1007, the method initializes the selected cache entry with the retrieved presentation data and returns to the beginning of the loop in step 1001 to process the next presentation cache entry.

IOleCache::Set Data

The method SetData initializes an entry in the presentation cache with designated presentation data. The method has two parameters: a formatetc indicating the particular format of the presentation data and a pointer to the storage medium where the designated presentation data is stored. This method is similar to the IOleCache::InitCache method, but only sets a single presentation cache entry. Another difference between the two is that the InitCache method will preferably not fill up cache entries tagged with ADVF_CACHE_NODATA, but SetData will preferably do so.

A client program can use this function in order to maintain a user-set or container-set icon aspect of an object. (Some container objects allow themselves or users to override the icon corresponding to an embedded or linked object.) If the client program desires to set up a cache entry for the icon aspect and fill it with an icon provided by the client program, then the client program creates a cache entry by calling the IOleCache::Cache method with ADVF_NODATA | ADVF_ONLYONCE | ADVF_PRIMEFIRST. The ADVF_NODATA flag specifies that the source object preferably does not provide presentation data when the data changes. The ADVF_ONLYONCE flag prohibits the source object from overriding the cache entry by breaking the advisory connection with the source object (from the object handler) once the cache entry has been filled. The ADVF_PRIMEFIRST flag specifies that the object handler should fill the cache entry immediately. The initialized presentation cache entry can be used to satisfy IViewObject::Draw requests to draw the icon aspect.

CreateDataCache

The CreateDataCache helper function creates and returns a new instance of a presentation cache object implementation provided by the underlying system. The instantiated object supports the IOleCache, IOleCache2, and IOleCacheControl interfaces for controlling the cache, the IPersistStorage interface for getting the source object bits in and out of persistent storage, and the IDataObject, IViewObject, and other interfaces. Typically, this object is used by authors of a server program for a source object implemented as a DLL instead of as a separate executable program (a server DLL).

IOleCache2 Interface

IOleCache2 interface is an extension of the IOleCache interface. It adds the ability for a client program to update with precise control each of the various presentation cache entries currently being maintained. Not all presentation cache objects implement this interface, though it is preferably implemented by the default presentation cache object provided in the system supplied default handler. Table 4 lists a preferred IOleCache2 interface. Each method is described in detail following the table.

TABLE 4

```
interface IOleCache2: IOleCache {
    virtual   HRESULT    UpdateCache(LPDATAOBJECT
                         pDataObject, DWORD grfUpdf,
                         LPVOID pReserved) = 0
    virtual   HRESULT    DiscardCache(DWORD
                         dwDiscardOptions) = 0;
};
```

IOleCache2::Update Cache

The UpdateCache method initializes the indicated presentation cache entries with the presentation data found in the designated object. The parameter pDataObject is a pointer to an object that contains presentation data for initializing the cache entries (used analogously to the IOle-Cache::InitCache method). The pointer preserved is preferably null and is reserved for future use. The parameter grfUpdf is a group of flag bits indicating which presentation cache entries to update. Typical values for grfUpdf are preferably one or more of the following flag bits:

| | |
|---|---|
| UPDFCACHE_NODATACACHE | = 0x00000001 |
| UPDFCACHE_ONSAVECACHE | = 0x00000002 |
| UPDFCACHE_ONSTOPCACHE | = 0x00000004 |
| UPDFCACHE_NORMALCACHE | = 0x00000008 |
| UPDFCACHE_IFBLANK | = 0x00000010 |
| UPDFCACHE_ONLYIFBLANK | = 0x80000000 |
| UPDFCACHE_IFBLANKORONSAVECACHE | = (UPDFCACHE_IFBLANK\| UPDFCACHE_ONSAVECACHE) |
| UPDFCACHE_ALL | = (~UPDFCACHE_ONLYIFBLANK) |
| UPDFCACHE_ALLBUTNODATACACHE | = (UPDFCACHE_ALL & ~UPDFCACHE_NODATACACHE) |

The flags are preferably interpreted as follows. The flag UPDFCACHE_NODATACACHE requests the Update-Cache method to update those cache entries created with the ADVF_NODATA flag in a prior call to IOleCache::Cache. The flag UPDFCACHE_ONSAVECACHE requests the UpdateCache method to update those cache entries created with the ADVFCACHE_ONSAVE flag in a prior call to IOleCache::Cache. The flag UPDFCACHE_ONSTOP-CACHE requests the UpdateCache method to update those cache entries created with the ADVFCACHE_ONSTOP flag in a prior call to IOleCache::Cache. The flag UPDF-CACHE_NORMALCACHE requests the UpdateCache method to update the other cache entries: the cache entries that were not created with explicit caching update control. These other cache entries are preferably updated on receipt of a data change notification from the running object. The flag UPDFCACHE_IFBLANK requests the UpdateCache method to update those cache entries which are presently blank. The flag UPDFCACHE_ONLYIFBLANK requests the UpdateCache method to update preferably only those cache entries which are presently blank and no others.

IOleCache2::DiscardCache

The DiscardCache method flushes the presentation cache entries presently found in memory, saving them out to persistent storage if dirty or just discarding them (and thus losing them forever) depending on the setting of the parameter dwDiscardOptions. The parameter dwDiscardOptions has one of two values: DISCARDCACHE_SAVEIFDIRTY to indicate a request to update the permanent cache entries stored persistently before discarding the memory version or DISCARDCACHE_NOSAVE to indicate a request to discard the presentation cache entries completely. In the DIS-CARDCACHE_NOSAVE case, subsequent presentation data requests from the client program will be satisfied by disk based data. Thus, this method allows a client program to synchronize the state of the in-memory version of the presentation cache.

IOleCacheControl Interface

The IOleCacheControl interface is typically used internally in an object handler or server DLL as the means by which the presentation cache part of the handler is connected to the IDataObject interface on the running object. The connection enables the presentation cache object to receive notifications from the running object and to thus maintain its presentation cache entries correctly. The IOleCacheControl interface is preferably supported by the presentation cache object provided by the system supplied default object handler. Table 5 lists a preferred IOleCacheControl interface. Each method is described following the table.

TABLE 5

```
interface IOleCacheControl: IUnknown{
    virtual   HRESULT   OnRun(LPDATAOBJECT
                              pDataObject) = 0;
    virtual   HRESULT   OnStop( ) = 0;
};
```

IOleCacheControl::OnRun

The OnRun method alerts the presentation cache object that the source object, which is the data source for the presentation cache, is now in running state. The pDataObject parameter is a pointer to the IDataObject interface of the source object. The presentation cache object will set up advisory notifications as it deems necessary with the source object using the pDataObject interface. If the presentation cache object already believes the source object is running, then this function does nothing. Some server DLLs may choose to use the presentation cache object in a passive manner and to not call the OnRun method. Rather, these programs preferably use IOleCache2::UpdateCache, IOle-Cache::InitCache, or IOleCache::SetData to fill the cache at the appropriate times.

IOleCacheControl::OnStop

The OnStop method informs the presentation cache object that it should terminate any existing connections with the data source object previously set up using the IOleCache-Control::OnRun method. No indication is given as to whether a connection existed or not.

IAdviseSink Interface

As mentioned earlier, some of the data transfer interfaces are implemented by an object handler to enable controlled access to the presentation cache. The IAdviseSink is an interface used to receive asynchronous notifications that result from a change in the source object. These changes typically occur when an object changes in such a way, for example, that its embedding and linking clients should update their cached presentations of the object. To establish an advisory connection between the source object and the object implemented by the client program (the sink object), the sink object invokes IDataObject::DAdvise on the source object, which eventually results in an IAdviseSink::On-DataChange callback on the sink object. A preferred definition of the IAdviseSink interface is listed in Table 6. The methods of the IAdviseSink as they relate to presentation caching are discussed in detail following the table.

TABLE 6

```
interface IAdviseSink: IUnknown{
    ...
    virtual  void  OnDataChange(LPFORMATETC
                   pformatetc, LPSTGMEDIUM
                   pmedium) = 0;
    virtual  void  OnViewChange(DWORD dwAspect, LONG
                   lindex) = 0;
};
```

IAdviseSink::OnDataChange

The OnDataChange method reports to the specified sink object that the presentation data for which it has previously requested notification has now changed. The previous request for notification originated by setting up an advisory connection with the source object using the IDataObject::DAdvise method of the source object. For example, as shown in FIG. 6, the container object 601 sets up an advisory connection regarding presentation data with object handler 602, and object handler 602 in turn sets up an advisory connection with the source object 603 in order to inform the container object 601 when the requested presentation data has changed within the source object 603. The OnDataChange method has two parameters: the pformatetc parameter indicates the format of the presentation data that has changed, and the pmedium parameter is a pointer to the changed data if data is provided.

Figure 11:
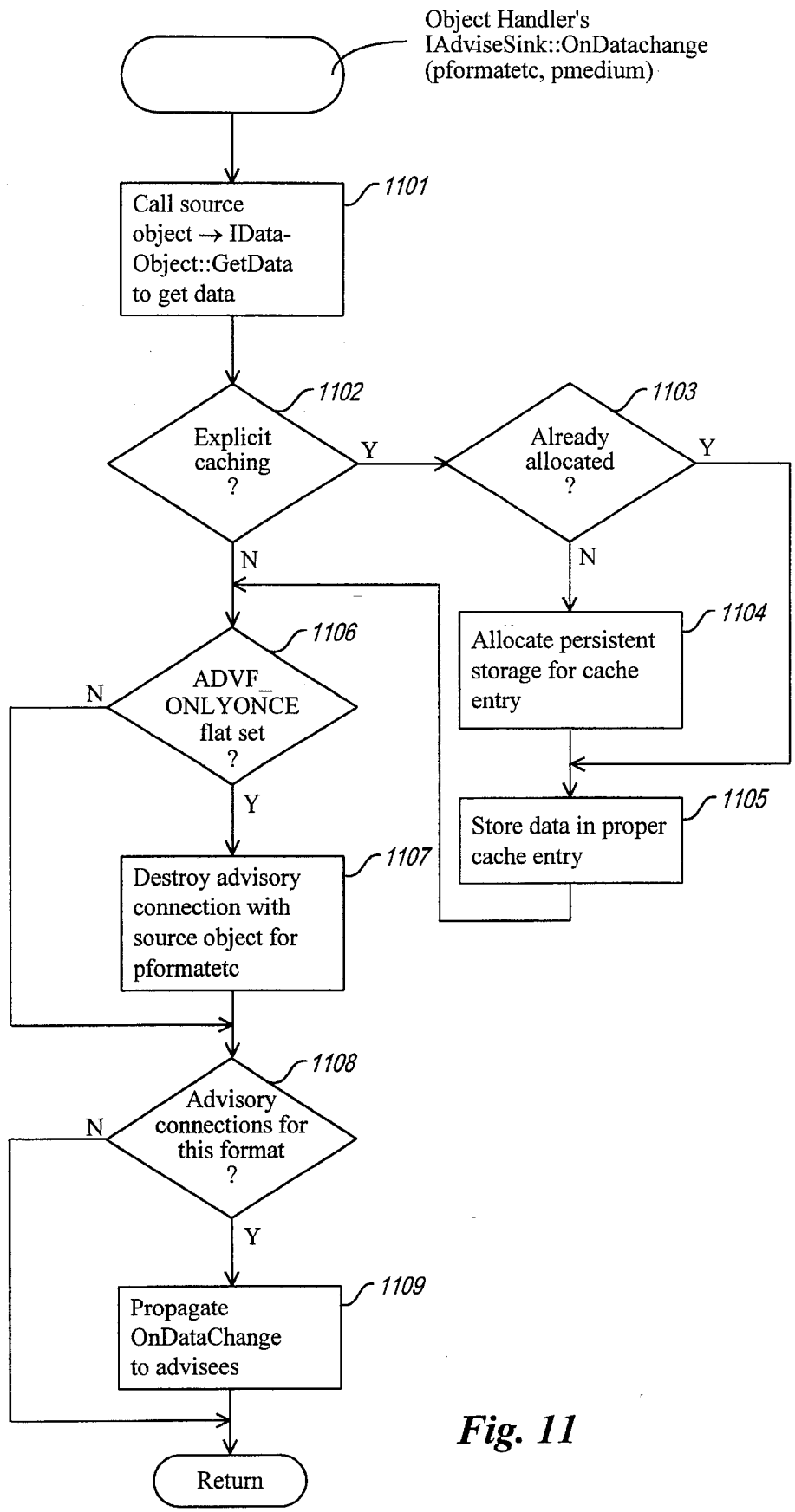
FIG. 11 is a flow diagram of a typical object handler implementation of the IAdviseSink::OnDataChange method.

FIG. 11 is a flow diagram of a typical object handler implementation of the IAdviseSink::OnDataChange method. When this method is invoked by the source object, the object handler invokes the GetData method of the source object to obtain data, caches it if necessary, and propagates the notification to the client program if the client program has set up an advisory connection for this presentation data format. Specifically, in step 1101, the method calls the IDataObject::GetData method of the source object to get the new presentation data corresponding to the designated formatetc parameter. In step 1102, the method determines whether the object handler is performing explicit caching and, if so, continues in step 1103, else continues in step 1106. In step 1103, the method determines whether the object handler has already allocated persistent storage for the corresponding presentation cache entry (e.g., during an IOleCache::Cache method call) and, if so, continues in step 1105, else continues in step 1104. In step 1104, the method allocates persistent storage for the cache entry and continues in step 1105. In step 1105, the method stores the retrieved presentation data in the corresponding cache entry. In step 1106, the method determines whether the client program set the ADVF_ONLYONCE update flag when requesting caching of this presentation data format. If so, the method continues at step 1107 to destroy the advisory connection with the source object, else continues at step 1108. In step 1107, the method destroys the advisory connection previously set up with the source object for this particular presentation data format, because the object handler has now updated the cache entry exactly once. In step 1108, the method determines whether any advisory connections have been set up for this presentation data format by the client program and, if so, continues at step 1109, else returns. In step 1109, the method propagates the OnDataChange notification to its advisee objects, and returns.

IAdviseSink::OnViewChange

The OnViewChange method notifies a sink object that the presentation data for which it has previously requested notification has now changed. This notification corresponds to a presentation format chosen by a source object (by its object handler) for rendering the object data (a view). The notification request was made by setting up an advisory connection using the IViewObject::SetAdvise method of the source object. The method has two parameters: the dwAspect parameter specifies the part of the object of concern (e.g., its content, thumbnail sketch, icon, or docprint aspect), and the lindex parameter identifies which subpart of the aspect has changed and is interpreted relative to the dwAspect parameter. The OnViewChange method as implemented by a client program is analogous to the OnDataChange method as implemented by an object handler (shown in FIG. 11). Preferably, the only substantive difference is that, instead of invoking the GetData method to obtain presentation data, the client program does nothing. Later, when the client program requests the object handler to draw the object (that is, requests the source object to choose a presentation format to render), the object handler chooses the presentation data from a series of possible formats. The draw method is discussed in detail below. Also, because this method is implemented by the client program, no propagation step (e.g., step 1109) is required.

IDataObject Interface

The IDataObject and IViewObject interfaces provide basic data transfer mechanisms. The IDataObject interface is used to send and receive client program specified presentation data formats, whereas the IViewObject interface is used to render presentation data in a source object specified data format. The IDataObject interface provides nine methods for data transfer support including GetData, GetDataHere, QueryGetData, GetCanonicalFormatEtc, SetData, EnumFormatEtc, DAdvise, DUnadvise, and EnumDAdvise. A preferred IDataObject interface is listed in Table 7. The methods of the IDataObject interface that are related to presentation caching, as they are typically implemented by an object handler, are discussed in detail following the table. The other methods are listed here for completeness and are discussed in detail in the OLE2 Programmer's Reference.

TABLE 7

```
interface IDataObject: IUnknown{
    virtual  HRESULT  GetData(LPFORMATETC pformatetc,
                      LPSTGMEDIUM pmedium) = 0;
    virtual  HRESULT  GetDataHere(LPFORMATETC
                      pformatetc, LPSTGMEDIUM
                      pmedium) = 0;
    virtual  HRESULT  QueryGetData(LPFORMATETC
                      pformatetc) = 0;
    virtual  HRESULT  GetCanonicalFormatEtc-
                      (LPFORMATETC pformatetcIn,
                      LPFORMATETC pformatetcOut) =
                      0;
    virtual  HRESULT  SetData(LPFORMATETC pformatetc,
                      LPSTGMEDIUM pmedium,
                      BOOL fRelease) = 0;
    virtual  HRESULT  EnumFormatEtc(DWORD
                      dwDirection, LPENUMFORMATETC
                      FAR *ppenumFormatEtc) = 0;
    virtual  HRESULT  DAdvise(LPFORMATETC
                      pformatetc, DWORD grfAdvf,
                      LPADVISESINK pAdvSink,
                      DWORD FAR *pdwConnection) = 0;
    virtual  HRESULT  DUnadvise(DWORD
                      dwConnection) = 0;
    virtual  HRESULT  EnumDAdvise(LPENUMSTATDATA
                      FAR *ppenumAdvise) = 0;
};
```

IDataObject::GetData

The GetData method allows a client program to retrieve presentation data from a source object through the object handler. The client program retrieves data presentations from the source object according to the preferences of the client program. Thus, the client program may request a specific format, a specific aspect, a format for a specific device and conveyance through a specific medium.

The method GetData has two parameters: a requested presentation format and a return parameter containing the retrieved presentation data. The pformatetc parameter is a pointer to a FORMATETC structure described in detail earlier. The members of the FORMATETC structure specify the preferences of the client program for receiving the presentation data. The tymed member of the pformatetc parameter indicates at least one medium type by which the client program would like to receive the presentation data in the specified format. If the object handler can support the requested preferences and one of the requested media, the object handler returns the requested data through the medium designated by the pmedium parameter. Otherwise, if the object handler cannot support the preferences or the requested media, the method GetData returns an error.

Figure 12:
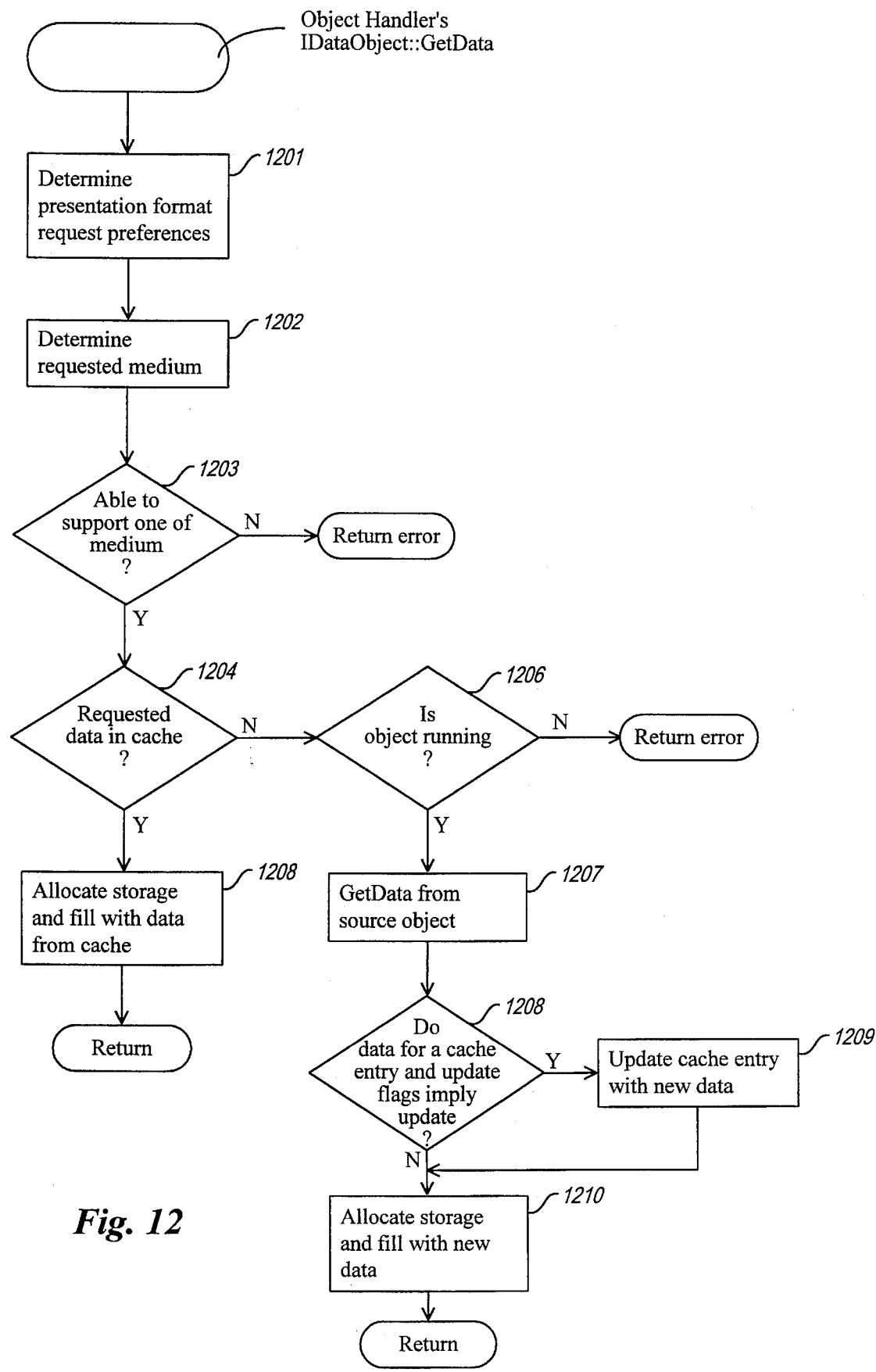
FIG. 12 is a flow diagram of a typical object handler implementation of the IDataObject::GetData method.

FIG. 12 is a flow diagram of a typical object handler implementation of the IDataObject::GetData method. The method first tries to satisfy the client program request from data in the presentation cache, otherwise it delegates the request to the source object. In step 1201, the method determines the requested presentation format preferences. In step 1202, the method determines the requested medium. In step 1203, the method determines whether it is able to support one of the requested media and, if so, continues in step 1204, else returns an error. In step 1204, the method determines whether the requested presentation data is currently in the cache and, if so, continues in step 1205, else continues in step 1206. In step 1205, the method allocates storage appropriate to the requested medium, fills it with data from the presentation cache, and returns. In steps 1206–1210, the method delegates the request to the source object and updates the corresponding presentation cache entry if appropriate. Specifically, in step 1206, the method determines whether the object is running and, if so, continues in step 1207, else returns an error. In step 1207, the method delegates the request to the source object (e.g., using the IDataObject::GetData method of the source object). In step 1208, the method determines whether the data received from the source object corresponds to a presentation cache entry and whether the update flags for that entry indicate that the entry should be updated. If so, the method updates the presentation cache entry with the new data in step 1209. Otherwise, the method allocates storage appropriate to the requested medium, fills it with the new data in step 1210, and returns.

IDataObject::GetDataHere

The GetDataHere method is similar to the GetData method, but enables a client program to specify the medium that is to be used for transferring the requested presentation data. Since the method receives a reference to the medium as a parameter, the method copies the requested presentation data onto the medium specified by the parameter. The method preferably still determines whether the object handler can support the requested preferences. The pformatetc pointer is the same as described with reference to the method GetData, except that tymed preferably indicates the type of medium designated by pmedium. The client program preferably allocates the storage medium designated by pmedium.

IDataObject::GetCanonicalFormatEtc

The GetCanonicalFormatEtc method enables a client program to determine what presentation formats will generate unique presentation cache entries for a given input FORMATETC parameter. Thus, the method GetCanonicalFormatEtc enables the client program to determine whether it will receive presentation data equivalent to presentation data the client program has already received. Therefore, if the client program has already requested presentation data caching for a particular presentation format, the client program can use the GetCanonicalFormatEtc method to optimize caching and prevent using memory or disk space for unnecessary duplicate copies.

The method GetCanonicalFormatEtc has two parameters. The pformatetcIn input parameter is a pointer to a FORMATETC structure that contains a presentation data preference. The pformatetcOut output parameter is a pointer to a FORMATETC structure that contains the characteristics of the requested presentation data that would be returned by the object handler if presentation data were requested for the format indicated by pformatetcIn. A value is returned to indicate whether the presentation data characteristics of pformatetcOut are the same as the characteristics designated by pformatetcIn.

IDataObject::SetData

The SetData method enables a client program to send data to an object handler to pass on to the source object. Invocation of this method on the object handler has no effect unless the source object is currently in a running state. If the source object is in a running state, the call is delegated to the server program by the object handler DLL.

IDataObject::EnumFormatEtc

The EnumFormatEtc method enumerates the available characteristics of presentation data that can be sent to or received from a source object. This method allows a client program, before requesting or sending data, to determine whether the data can be received or sent according to client program preferences. When invoked on an object handler, the handler provides an instance of an enumerator class that preferably provides methods to return the next available format and to reset to the "beginning" of any structure it keeps. These methods preferably search the presentation cache first for available presentation formats, before delegating the request to the server object (if the server object is running). That is, when a client program requests enumeration of the next formatetc, the enumerator exhausts all of the presentation cache entries first and then, if the object is running, the enumerator delegates the request on to the source object. When the source object responds that it can support no other formatetcs, the object handler indicates that it has enumerated all possibilities. If the source object is not running, the object handler signals that it has enumerated all possibilities when it has exhausted the presentation cache entries. Note that presentation data formats can be registered statically with the persistent registry. In this case, an object handler may choose to use the static list.

The method has two parameters. The wDirection parameter indicates whether the request is for characteristics supported for a SetData or a GetData method. The ppenumFormatEtc is a pointer to an enumerator which enumerates the available formats for the presentation data of the object.

IDataObject::DAdvise

The DAdvise method establishes an advisory connection between an object handler and a sink object. An advisory connection is a logical connection between a sink object and a source object where, when the data of the source object changes, the source object notifies the sink object of the change. (See also the description under the IAdviseSink interface.) The sink object is any object supporting the IAdviseSink interface. To support presentation caching, advisory connections are established both between the container object and the object handler and between the object handler and the source object. A client program calls the object handler's DAdvise method to request the object handler to notify it when the designated presentation data changes and in what manner the client program wishes to be notified. For example, the client can request that the object handler suppress the transfer of data in the notification or that the object handler perform only one notification. In response to the client setting up an advisory connection, the object handler sets up a corresponding advisory connection with the source object. Later, when the data in the source object changes, the source object invokes the IAdviseSink::OnDataChange method of the object handler, which in turn invokes the IAdviseSink::OnDataChange method of the object managed by the client program (see FIG. 11). The appropriate IAdviseSink interfaces are passed in the DAdvise method.

IViewObject Interface

IViewObject interface enables a client program to request a source object to display a pictorial representation of itself by drawing on a client program provided device context. A device context is a structure provided by the underlying system for communicating to device drivers in order to render data. Independent of the drawing device context, the client program can specify a target device to be used by the source object to compose the picture. The picture can thus be composed for drawing on one target device but can then be drawn on a device context belonging to another device. Different kinds of pictures can be produced from the source object: The client program can ask for a content representation (e.g., to display as an embedding), an iconic representation, etc. In addition, the client program can request an advisory connection so that it can be informed when the data rendered in the picture produced by the object changes.

IViewObject interface is similar to the IDataObject interface, but the source object decides the presentation format to be rendered. The IViewObject interface is typically implemented by the object handler for the source object. That is, the IViewObject interface is typically not implemented by the server program because one role of the object handler is to manage presentation data rendering when the server program is unavailable or not running. The object handler, on behalf of the source object, determines which presentation format to use for drawing presentation data. Preferably, the default object handler provided by the underlying system satisfies a request to draw using one of three data formats in the following order: CF_METAFILEPICT (a metafile script for producing a picture), CF_DIB (a device independent bitmap), and CF_BITMAP (a device dependent bitmap). A custom handler object can be provided if the source object prefers to use a different format. Table 8 lists a preferred IViewObject interface.

TABLE 8 interface IViewObject: IUnknown {
| virtual | HRESULT | Draw(DWORD dwAspect, LONG lindex, void *pvAspect, DVTARGETDEVICE *ptd, HDC hicTargetDev, HDC hdcDraw, LPCRECTL lprcBounds, LPCRECTL lprcWBounds, BOOL (CALLBACK *pfnContinue) (DWORD), DWORD dwContinue) = 0; |
| virtual | HRESULT | GetColorSet(DWORD dwAspect, LONG lindex, void FAR *pvAspect, DVTARGETDEVICE *ptd, HDC hicTargetDev, LPLOGPALLETTE FAR *ppColorSet) = 0; |

TABLE 8-continued

| virtual | HRESULT | Freeze(DWORD dwAspect, LONG lindex, DWORD FAR *pdwFreeze) = 0; |
| virtual | HRESULT | UnFreeze(DWORD dwFreeze) = 0; |
| virtual | HRESULT | SetAdvise(DWORD grfAspects, DWORD grfAdvf, LPADVISESINK pAdvSink) = 0; |
| virtual | HRESULT | GetAdvise(DWORD FAR *pgrfAspects, DWORD FAR *pgrfAdvf, LPADVISESINK FAR *ppAdvSink) = 0; |
};

When asked to do presentation caching on a source object determined format, the first time that the source object is placed in running state, the object handler invokes the IDataObject::GetData method of the source object with a succession of data formats in order to determine what presentation formats are actually available from the running object. It tries, in order, the following clipboard formats: CF_METAFILEPICT, CF_DIB, and CF_BITMAP. Thus, server programs who choose to rely on the default object handler (that is, do not implement custom handlers) will preferably support these formats in their IDataObject::GetData methods. Internally, the default handler preferably converts CF_BITMAP data to CF_DIB data before storing it persistently.

The method Draw is the primary method used in conjunction with presentation data caching. The other methods are listed here for completeness and are discussed in detail in the OLE2 Programmer's Reference.

IViewObject::Draw

The Draw method requests the object handler to draw a piece of an aspect of the source object on a supplied device context with formatting, font selection, and other compositional decisions made as if the source object were going to be drawn on the designated target device. The method has ten parameters.

Several parameters are the same as those defined for a FORMATETC structure. The dwAspect parameter indicates what kind of picture of the object is requested. Legal values for this parameter are analogous to those described previously for the FORMATETC structure. Preferably only one value is specified. The parameter lindex indicates a range based upon dwAspect. The relationship between the dwAspect parameter and the lindex parameter is analogous to that described previously for the FORMATETC structure. The ptd parameter is a pointer to the target device for which the data is preferably drawn by the object.

The other parameters are as follows. The parameter pvAspect is reserved for further parameterization of what is to be drawn. This parameter is typically NULL. The parameter hicTargetDev is an information context on the ptd target device. It may in fact be a full device context instead of a mere information context, but the object handler should preferably not rely on that. The hdcDraw parameter is a device context onto which the drawing should preferably be done. The lprcBounds parameter points to a structure which indicates the rectangle on the device hdcDraw context on which the presentation data should be drawn. This parameter controls the positioning and stretching of the object. The lprcWBounds parameter is NULL unless hdcDraw is a metafile device context. (Recall that a metafile is a script of graphical drawing calls with the data included.) If non-NULL, then lprcWBounds points to a structure defining the bounding rectangle of the metafile underneath hdcDraw. The rectangle indicated by lprcBounds is nested inside this rectangle; they are in the same coordinate space. The pfnContinue parameter is a callback function that the object handler should call periodically during a lengthy drawing operation to determine whether the operation should be aborted. A return of false (zero) from the callback indicates that the client program desires the drawing to stop, and that the Draw call should return an abort indicator. The callback function is preferably an exported function from the client program. The dwContinue parameter is a value that should be passed back as the argument to pfnContinue.

Storage of Cached Presentations

As mentioned earlier, cached presentation data may or may not be stored persistently. If stored persistently, they are stored as part of the source object's (or the link object's) persistent storage. Because this persistent storage is available to the object handler for the source object once the embedded or linked source object is loaded, the server program implementing the source object need not be running in order to access presentation data from a persistently stored presentation cache.

Presentation cache entries are considered persistent across sessions. That is, when a container object is closed and then later reopened, when its embedded or linked objects are loaded, presentation cache entries stored in the persistent storage are resurrected in order to fill an in-memory version of the presentation cache for use by the object handler. Thus, the presentation cache is persistent, although the advisory connections between the client program, the object handler, and the server program need to be reestablished upon reopening the container object.

The presentation cache object provided by the underlying system supports implicit and explicit caching of presentation data as mentioned earlier. Recall that explicit caching means that the presentation data cached is stored in memory and saved on the source object persistent storage by the time the object is closed. Implicit caching, on the other hand, means that the object handler directly supports access to the source object presentation data from the native data in persistent storage. (The object handler need not even store an in-memory copy in this case.) The presentation cache object provided by the underlying system preferably supports both implicit and explicit data caching. Thus, a custom object handler that wants to access native data can be designed to use the system supplied presentation cache object.

In a preferred embodiment, the underlying operating environment provides structured storage for storing objects. In the Microsoft OLE 2.0 environment, persistent storage for objects is provided through the IStorage and IStream interfaces. These interfaces are discussed in detail in U.S. patent application Ser. No. 07/909,533, entitled "Method and System for Storing and On-Demand Loading of Objects," which is hereby incorporated by reference. For the purposes of understanding the present invention, the IStorage interface is supported by storage objects, which can contain other storage objects or stream objects. Stream objects are objects that support the IStream interface. The IStorage interface defines methods, among others, for creating and opening child storage and stream objects and for committing transactions to the storage object. The IStream interface defines methods, among others, for reading and writing stream objects. Roughly speaking, the IStream and IStorage interfaces as implemented by specific object implementations support the storage of objects in an analogous manner to the way files and directories support the hierarchical storage of files in a file system.

Typically, objects within the Microsoft OLE 2.0 environment are stored in storage objects that support the IStorage interface even if the object only makes use of one stream within the storage object (for its persistent data). Preferably, each cached instance of presentation data is stored as an object connected to the same storage object to which the source object data is connected (the "parent" storage object). That is, in an abstract sense, both the source object and its cached presentation data are connected to the same parent storage object.

Preferably, the stream object used to store an instance of cached presentation data is named according to a reserved naming scheme for easy recognition by an object handler. For example, in the preferred embodiment, the name of the stream object is prepended with a "\0x02" for recognition purposes. One skilled in the art will recognize that other names are possible.

Figure 13:
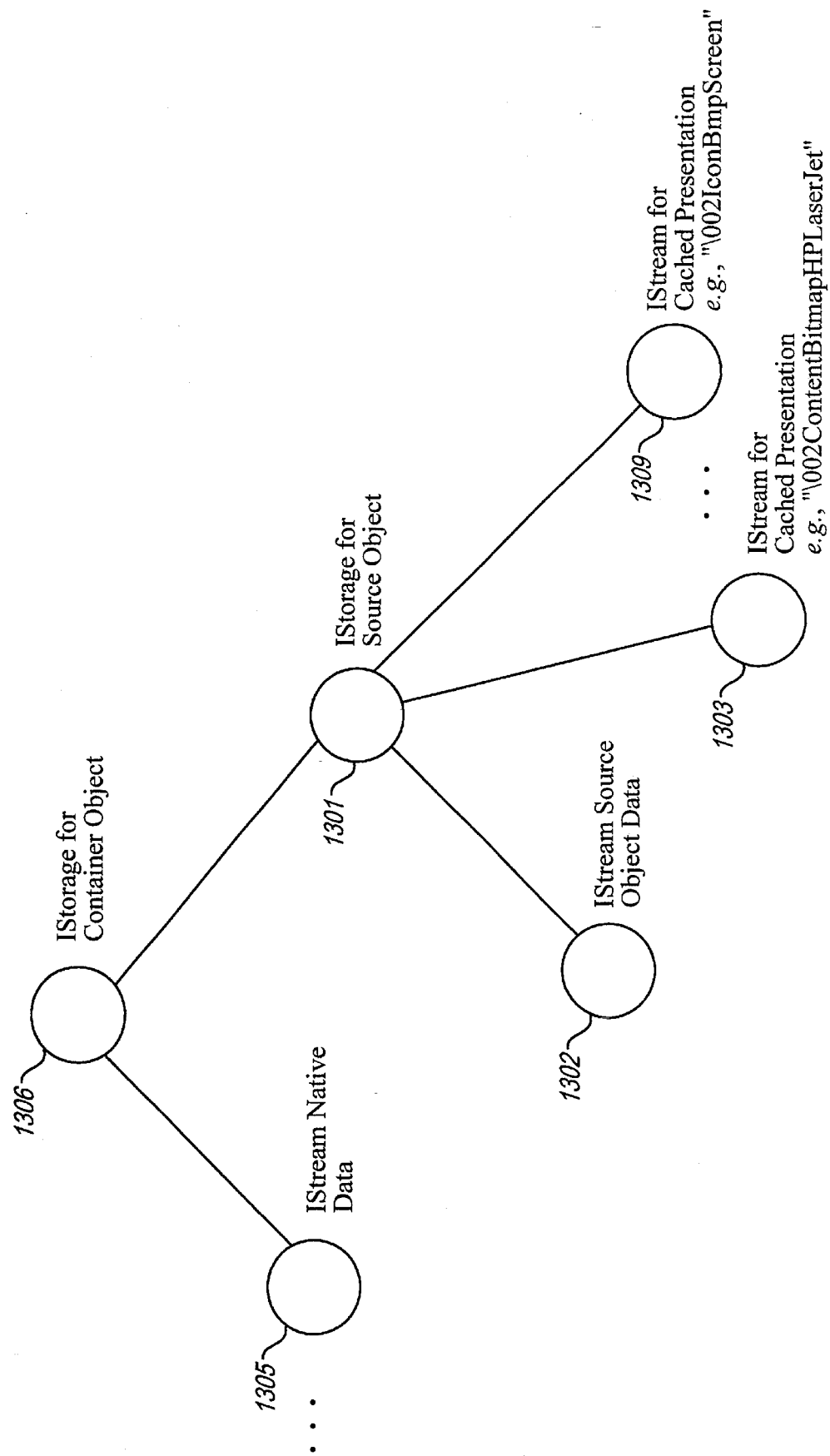
FIG. 13 is a block diagram of the structured storage layout for cached presentation data stored persistently as instances of stream objects.

FIG. 13 is a block diagram of the structured storage layout for cached presentation data stored persistently as instances of stream objects. The structured storage layout as shown comprises six objects possibly connected to other objects within a storage hierarchy. The objects in FIG. 13 are labeled with an appropriate interface name to indicate that the circle represents an object supporting that interface. Storage object 1301 is the parent storage object for the source object of interest. Stream object 1302 stores the persistent data for the source object. Stream object 1303 stores an instance of presentation data, as specified by a particular formatetc, that belongs to source object 1301. For example, stream object 1303 has a name indicating that the cached presentation data corresponds to a bitmap format of the source object content formatted for a printer. Stream object 1304 stores the presentation data corresponding to another formatetc also belonging to object 1301. Both stream objects 1303 and 1304 correspond to individual cache entries in the presentation cache object in-memory data structure (see, e.g., FIG. 8). Stream object 1306 is an IStorage object belonging to the container object containing the source object as embedded data. The native data of the container object is stored as a stream object 1305 within the hierarchy of the storage object of the container object 1306. (Although shown in this manner, it is not necessary for the container object to allocate a storage object for itself or for the container object to store its own native data in a stream object. Preferably, the container object provides some way to access the storage object of the source object 1301.)

Figure 14:
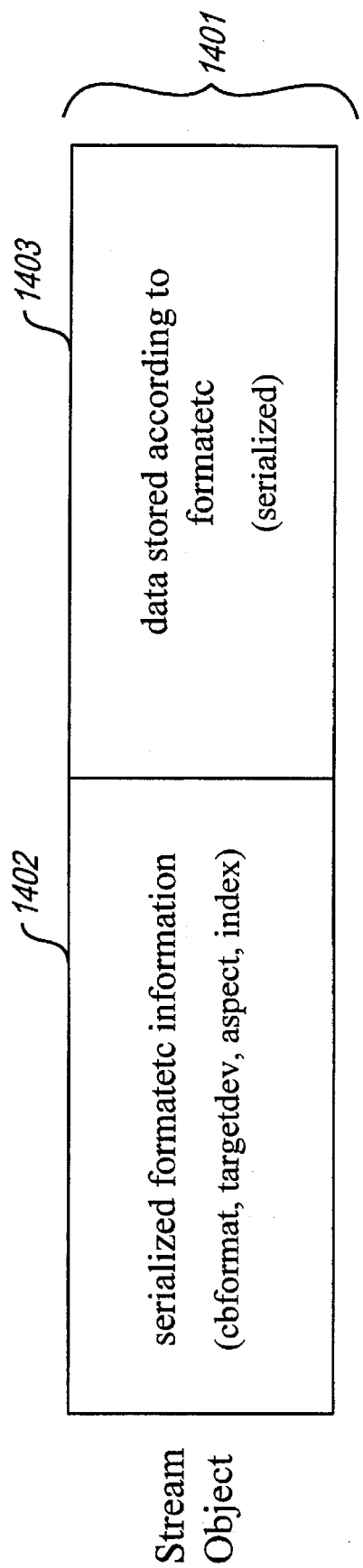
FIG. 14 is a detailed block diagram of the contents of a stream object used to store cached presentation data.

FIG. 14 is a detailed block diagram of the contents of a stream object used to store cached presentation data. Stream object 1401 contains two fields. Field 1402 is a serialized version of the formatetc information describing the presentation data. Field 1403 is the serialized presentation data stored according to the formatetc contained in field 1402.

Customized Presentation Cache Control

There are several ways a client program and a server program can assert control over the retrieval or caching of presentation data. As described in detail earlier, a client program can control the updating of cache entries in a presentation cache through the update flags in its request to an object handler to cache a particular format of presentation data (e.g., the grfAdvf parameter in the IOleCache::Cache method). Recall that these flags enable a client program to indicate that the cache is to be filled immediately, or only the first time the data changes, or never automatically by the object handler. In addition, the client program can specify that a particular cache entry should be always persistently saved or saved in persistent storage when the source object is closed. The client program also has control over updating particular cache entries by using either the IOleCache::InitCache method to initialize cache entries from a designated object or by using the IOleCache::SetData method to initialize a single cache entry from designated data. Also, if a presentation cache object supports the IOleCache2 interface, then a client program can use the UpdateCache method to update a series of cache entries from client program supplied data based upon the original update criteria of the cache entries. In addition, the client program can synchronize its non-native data with its native data by using the DiscardCache method to flush the in-memory version of the presentation cache and to optionally save the cache entries in persistent storage.

A server program can also control the contents of the presentation cache associated with the source object. First, within the bounds of the client program request, an object handler for a server program can preferably choose whether or not to persistently store a cache entry and whether or not to request updated data. In this manner, the object handler can optimize interprocess accesses to the server program. Second, a server program can provide a customized object handler instead of relying upon the default object handler provided by the underlying system. One reason a server program might want to provide a customized object handler is to respond to client program requests for the object to draw itself by providing data in a format other than the three formats supported by the system provided default object handler (CF_METAFILEPICT, CF_DIB, and CF_BITMAP). For example, a server program might desire to draw the source object in its own scripting language instead of the metafile format. In order to do this, the server program typically provides its own custom object handler. Preferably, the custom object handler incorporates the default object handler to enable the server program to delegate all functionality it does not wish to handle to a system supplied object. In addition, the custom object handler preferably instantiates an instance of the system supplied presentation cache object unless the server program wishes to implement its own cache control. Note that in an environment such as the OLE 2.0 environment, objects can be incorporated into other objects using a mechanism known as aggregation. Aggregation is discussed in detail in the OLE2 Programmer's Reference.

Figure 15:
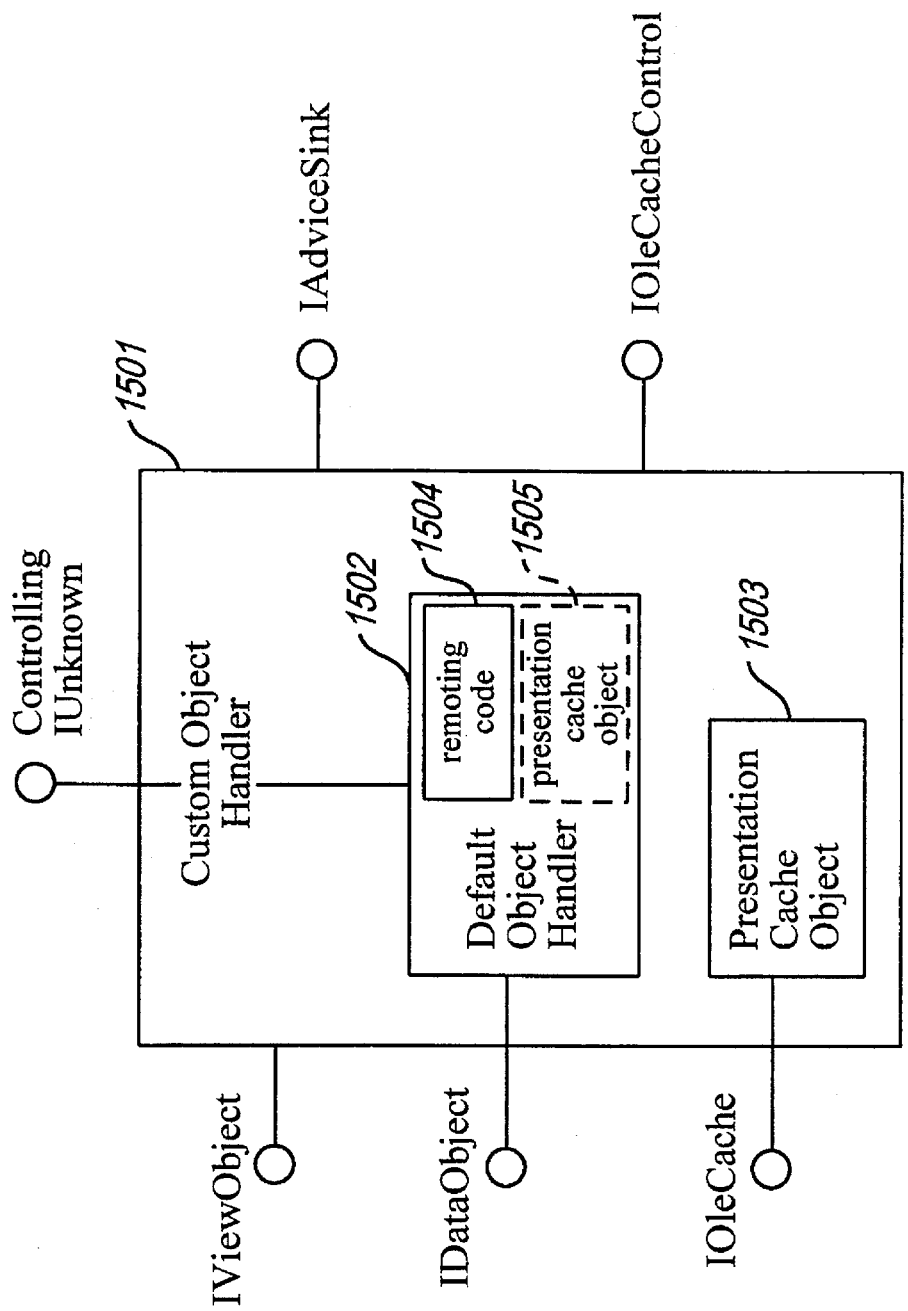
FIG. 15 is a block diagram of an example custom object handler.

FIG. 15 is a block diagram of an example custom object handler. Example custom object handler 1501 contains a default object handler 1502 and its own presentation cache object 1503. As mentioned, if a custom object handler does not wish to implement its own caching functionality, the custom object handler 1501 can instead incorporate an instance of the system supplied presentation cache object. In FIG. 15, a system supplied presentation cache object 1505 is shown as dotted lines within the default object handler 1502. Note also that a custom object handler such as custom object handler 1501 need not incorporate the system supplied default handler 1502, but preferably does so to avoid duplicating a lot of functionality. The default object handler 1502 also contains the code for communicating remotely with the server program for its corresponding source object (remoting code 1501). As shown in FIG. 15, custom handler 1501 provides its own IViewObject interface, IAdviseSink interface and two of the three presentation cache object interfaces, IOleCache and IOleCacheControl. The custom object handler 1501 has chosen not to provide its own IDataObject interface. This type of situation might occur (as described above) when the server program implementing the source object wants to draw itself using native data of the source object, but does not otherwise need to have control over data transfer. One skilled in the art will recognize that many other possibilities for creating a custom object handler are available, including varying what interfaces are supported and what system supplied objects are incorporated.

Rendering Objects Using a Presentation Cache

As mentioned earlier, there are two basic styles a client program uses to render data using a presentation cache. First, the client program can set up the presentation cache and advisory connections for the particular presentation data changes for which the client program wishes to be notified. Second, the client program can request the object handler to cache particular presentation formats, but not request any advisory connections or notifications of data changes.

Figure 16:
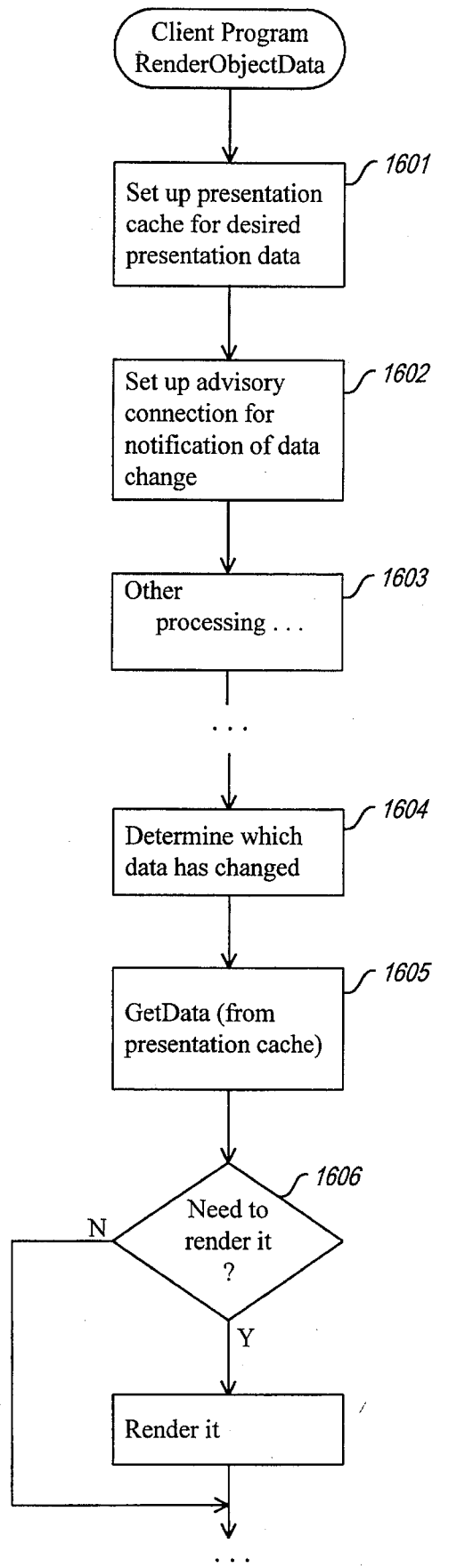
FIG. 16 is an overview flow diagram of the series of steps executed to render object data using a presentation cache when the client program has requested advisory connections.

FIG. 16 is an overview flow diagram of the series of steps executed by a client program to render object data using a presentation cache when the client program has requested advisory connections. Note that this series of steps is executed at some point among all the steps a client program performs. In step 1601, the client program sets up the presentation cache for a desired presentation data (e.g., using IOleCache::Cache). In step 1602, the client program sets up advisory connections for notifications on particular data formats (e.g., using IDataObject::DAdvice and IViewObject::SetAdvice). In step 1603, the client program performs other processing. Sometime later, when a client program callback routine is invoked by the object handler, the client program continues in step 1604. In step 1604, the client program determines which presentation data has changed. In step 1605, the client program obtains the presentation data for which it was notified (e.g., using IDataObject::GetaData). In step 1606, the client program decides whether it wants to render the data and, if so, continues in step 1607, else returns. In step 1607, the client program renders the presentation data and returns.

Figure 17:
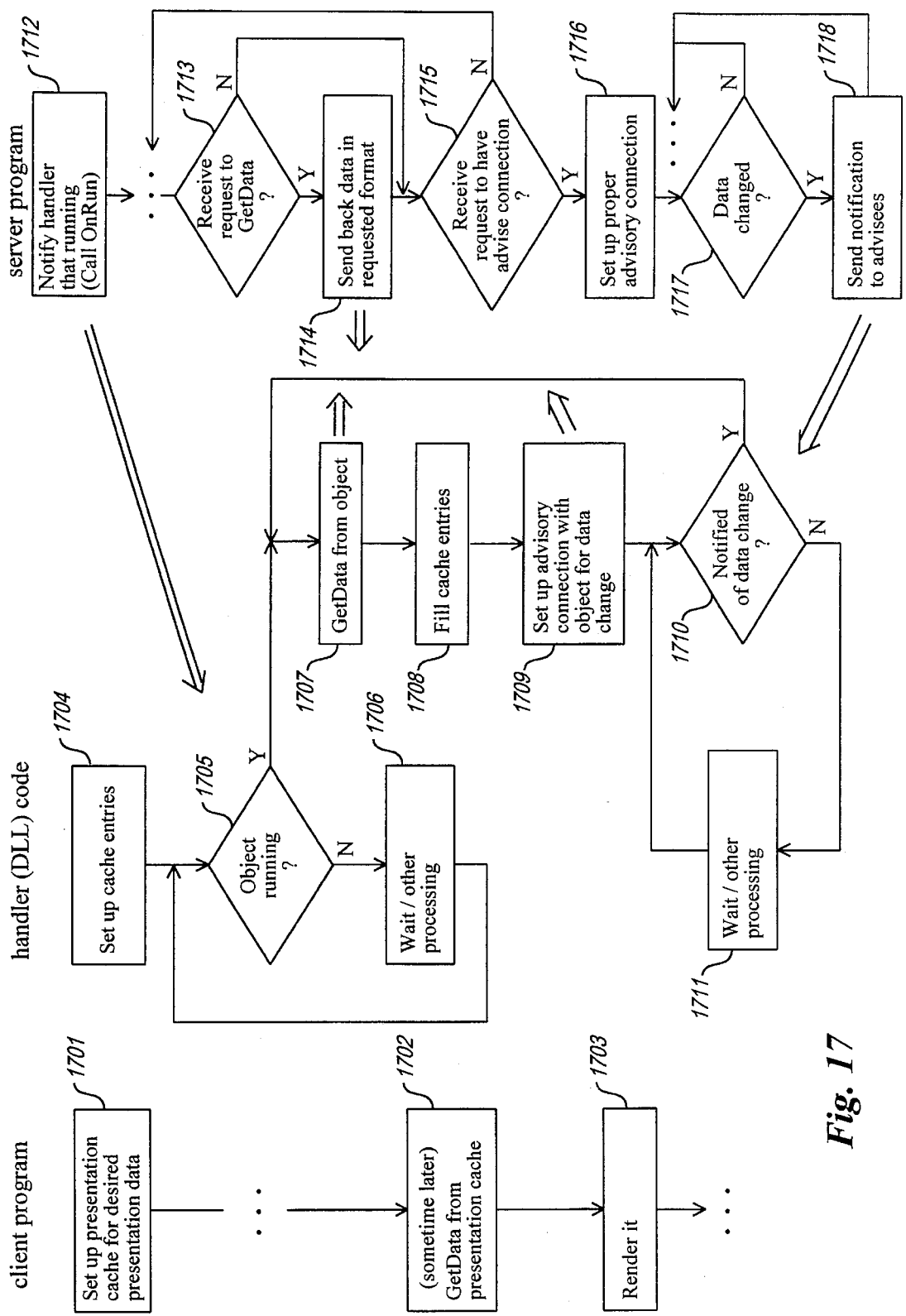
FIG. 17 is an overview flow diagram of the series of steps executed by a client program and a server program to render object data from a presentation cache without client program advisory connections.

FIG. 17 is an overview flow diagram of the series of steps executed by a client program and a server program to render object data from a presentation cache without client program advisory connections. FIG. 17 shows the interaction between a client program, an object handler DLL, and a server program when the client program sets up presentation caching, but does not specify any advisory connections. (Note that although not shown in FIG. 16, similar interactions occur when a client program has set up advisory connections.) The double line arrows in the figure indicate interprocess communication. Recall that the object handler code resides in the code execution address space of the client program. In summary, the client program sets up the presentation cache and sometime later requests the data from the presentation cache and renders it. The object handler code sets up the requested cache entries, fills the cache entries on its own, and does whatever other processing is required. The server program notifies the object handler that it is running, responds to requests to retrieve data or to set up advisory connections, and sends notifications and data changes to the object handler.

Specifically, in step 1701, the client program sets up the presentation cache for all presentation data desired. In response, in step 1704, the object handler code sets up the requested cache entries. In step 1705, the object handler code determines whether the object is running and, if so, continues in step 1707, else continues in step 1706. In 1706, the object handler code continues other processing or waits until the source object transitions to the running state. In step 1707, the object handler code requests presentation data from the object corresponding to the presentation cache entries whose update flags indicate that updating is requested. In step 1708, once the data has been received from the server program, the object handler code fills the appropriate cache entries. In step 1709, the object handler code sets up advisory connections with the server program for cache entries where necessary. In step 1610, the object handler code determines whether it has been notified of a data change and, if so, continues back in step 1707 to retrieve the corresponding presentation data from the server program. Otherwise, the object handler code continues in step 1611 to wait for other data changes or to perform other processing.

The server program once it transitions to running state, notifies the object handler code in step 1612 that it is now running. (This notification is detected in step 1705 in the object handler code.) Sometime later, in the server program message handler for receiving interprocess communication requests, the server program continues in step 1613. In step 1613, the server program determines whether the message received is a request for presentation data and, if so, continues in step 1614, else continues in step 1615. In step 1614, the server program sends the presentation data to the object handler code in the requested format. In step 1615, the server program determines whether the message received is a request to set up an advisory connection and, if so, continues in step 1616, else continues with other message processing. In step 1616, the server program sets up the proper advisory connection depending upon the request. At some later point in the server program processing, when the source object data has changed, the server program will preferably notify any objects that have previously set up advisory connections for the data. In step 1617, the server program determines whether any data has changed and, if so, continues in step 1618, otherwise performs other processing. In step 1618, the server program sends notification to the proper callback routines of the advisees of all advisory connections for that particular presentation data. (This notification is received in the object handler code in step 1610.)

Independent of the object handler code processing and the server program processing, the client program at any time can request data from the source object. For example, in step 1702, the client program sends a request to the object handler to get data from the presentation cache. This request will be answered by the object handler routine responsible for getting data from the presentation cache or for delegating the request to the source object. (For example, see the IDataObject::GetData method as described with reference to FIG. 12.) Then in step 1703, the client program renders the retrieved presentation data.

One skilled in the art will recognize that there are many ways to combine the methods and interfaces previously discussed in order to render objects using presentation data from a presentation cache.

Although the present invention has been described in terms of preferred embodiments, it is not intended that the invention be limited to these embodiments. Equivalent methods, structures, processes, steps, and other modifications within the spirit of the invention fall within the scope of the invention. The scope of the present invention is defined by the claims which follow.

We claim:

1. A method in a computer system for caching presentation data of a source object, the presentation data for rendering a representation of the source object, the computer system having client code and object handler code, the source object having server code for communicating with the object handler code, the method comprising the computer-implemented steps of:

under control of the client code, invoking the object handler code;

under control of the invoked object handler code, instantiating a presentation cache object having presentation cache code and having a plurality of entries;

under control of the client code, requesting the presentation cache code of the instantiated cache object to cache presentation data in a plurality of specified presentation formats;

under control of the presentation cache code, in response to the request to cache presentation data,
  requesting presentation data from the server code in the plurality of specified presentation formats;
  receiving the requested presentation data in the plurality of specified presentation formats from the server code; and
  storing each of the received presentation data in the specified presentation format in an entry in the presentation cache object;

under control of the client code, invoking the object handler code to request presentation data in one of the plurality of specified presentation formats;

under control of the invoked object handler code and in response to the request for presentation data,
  determining which entry in the presentation cache contains the requested presentation data;
  retrieving the stored presentation data from the determined entry in the presentation cache; and
  sending the retrieved presentation data to the client code; and under control of the client code,
  receiving the sent presentation data from the object handler code; and
  rendering the received preparation data to represent the source object.

2. A method in a computer system for caching presentation data for a source object, the presentation data for rendering a representation of the source object, the computer system having a client object, the method comprising the computer-implemented steps of:

instantiating a presentation cache object of a presentation cache class having presentation cache code for controlling contents of the presentation cache object;

under control of the client object, requesting the instantiated presentation cache object to cache presentation data in a specified presentation format; and under control of the presentation cache code of the instantiated presentation cache object,
  receiving the request from the client object to cache presentation data in the specified presentation format;
  requesting presentation data from the source object in accordance with the specified presentation format received in the request;
  receiving the requested presentation data from the server code; and
  storing the received presentation data in the presentation cache object, wherein the stored presentation data is retrieved from the presentation cache object by executing the presentation cache code to access the cached presentation data.

3. The method of claim 2 wherein the step requesting the instantiated presentation cache object to cache presentation data in the specified presentation format further comprises the substep of indicating a frequency for updating the contents of the presentation cache object.

4. The method of claim 2 wherein the step of storing the received presentation data in the presentation cache object stores the presentation data on a persistent medium.

5. A method in a computer system for caching presentation data of a source object in a presentation cache, the presentation data for rendering a representation of the source object, the source object having object handler code, the computer system having client code with a code address space in which the client code is executed, the method comprising the computer-implemented steps of:

loading the object handler code in the code address space of the client code;

allocating the presentation cache in the code address space of the client code; and under control of the loaded object handler code,
requesting presentation data from the source object in a plurality of presentation formats;
receiving the requested presentation data in the plurality of presentation formats from the source object;
storing the received presentation data in a plurality of entries in the presentation cache, each entry corresponding to the received presentation data for one of the plurality of presentation formats; and
upon receiving a request from the client code for presentation data in a specified one of the plurality of presentation formats, retrieving stored presentation data from one of the plurality of entries in the presentation cache object that corresponds to the specified one of the plurality of presentation formats so that the retrieved presentation data can be rendered by the client code to represent the source object.

6. The method of claim 5 wherein the step of storing the received presentation data in the presentation cache stores the presentation data on a persistent medium.

7. The method of claim 6 wherein the presentation data is stored persistently regardless of any preference of the loaded object handler code.

8. The method of claim 5 wherein the presentation cache is an object with data members referencing the plurality of entries in the presentation cache and function members for accessing the plurality of entries.

9. The method of claim 5 further comprising the step of receiving from the source object an indication that two specified presentation formats yield duplicate presentation data, and wherein the step of storing the received presentation data in the plurality of entries stores an indicator of the duplicate presentation data.

10. A method in a computer system for caching presentation data for a source object, the presentation data for rendering a representation of the source object, the source object having object handler code, the computer system having client code with a code address space in which the client code is executed, the method comprising the computer-implemented steps of:

loading the object handler code in the code address space of the client code;

allocating a presentation cache in the code address space of the client code;

under control of the client code, requesting the loaded object handler code to cache presentation data in a specified presentation format; and under control of the loaded object handler code,
requesting from the source object presentation data in the specified presentation format;
receiving from the source object the requested presentation data; and
storing the received presentation data in the presentation cache so that the stored presentation data can be retrieved and rendered to represent the source object.

11. The method of claim 10 wherein the step of requesting the loaded object handler code to cache presentation data in the specified presentation format further comprises the step of indicating a frequency for updating the contents of the presentation cache.

12. The method of claim 10 wherein the step of storing the received presentation data in the presentation cache stores the presentation data on a persistent medium.

13. The method of claim 12 wherein the presentation data is stored persistently regardless of any preference of the loaded object handler code.

14. A method in a computer system for caching presentation data for a source object, the source object having object handler code, the computer system having client code with a code address space in which the client code is executed, the method comprising the computer-implemented steps of:

loading the object handler code in the code address space of the client code;

allocating a presentation cache in the code address space of the client code;

under control of the client code, requesting the loaded object handler code to cache presentation data having a specified data format and specified context characteristics; and under control of the loaded object handler code,
requesting presentation data from the source object in accordance with the specified data format and context characteristics;
receiving the requested presentation data from the source object; and
storing the received presentation data in the presentation cache.

15. The method of claim 14 wherein the specified context characteristics include device information that is requested in the same request to the source object as the specified data format and wherein the step of receiving from the source object the requested presentation data receives presentation data arranged according to the device information.

16. The method of claim 14 wherein the specified context characteristics include view information and wherein the step of receiving from the source object the requested presentation data receives presentation data arranged according to the view information.

17. The method of claim 16 wherein the view information specifies that the requested presentation data is an icon.

18. The method of claim 16 wherein the view information specifies that the requested presentation data is a thumbnail sketch of the source object.

19. The method of claim 16 wherein the view information specifies that the requested presentation data is the contents of the source object.

20. The method of claim 16, the computer system having a printer, and wherein the view information specifies that the requested presentation data is formatted for printing on the printer.

21. The method of claim 14 wherein the specified context characteristics include an indication of a type of storage medium to transfer the presentation data and wherein the step of receiving from the source object the requested presentation data receives presentation data arranged according to the type of storage medium indicated.

22. The method of claim 14 wherein the step of storing the received presentation data in the presentation cache stores the presentation data on a persistent medium.

23. The method of claim 22 wherein the presentation data is stored persistently regardless of any preference of the loaded object handler code.

24. A method in a computer system for caching presentation data of a source object in a presentation cache object, the computer system having a client object, the method comprising the computer-implemented steps of:

under control of the client object,
requesting the presentation cache object to cache presentation data in a specified presentation format; and
indicating advisory information to the presentation cache object indicating when the client object is to be advised of changes in the presentation cache object; and under control of the presentation cache object,
receiving the request to cache presentation data in the specified presentation format;
receiving the indicated advisory information;
requesting presentation data from the source object in the specified presentation format;
receiving the requested presentation data from the source object;
storing the received presentation data in the presentation cache object; and
advising the client object of the presence of the cached presentation data in accordance with the indicated advisory information.

25. The method of claim 24 wherein the step of storing the received presentation data in the presentation cache stores the presentation data on a persistent medium.

26. The method of claim 24 wherein the step of requesting the presentation cache object to cache presentation data in the specified presentation format further comprises the step of indicating a frequency for updating the contents of the presentation cache object.

27. The method of claim 24 wherein the step of requesting the presentation cache object to cache presentation data in the specified presentation format further comprises the step of specifying a data format and context characteristics for the presentation data and wherein the step of receiving the requested presentation data from the source object receives presentation data arranged according to the specified data format and context characteristics.

28. The method of claim 24 wherein the presentation cache object contains a plurality of entries, each entry storing presentation data in a different presentation format.

29. A computer system for caching presentation data comprising:

source object that, in response to receiving a request for presentation data in a requested presentation format, returns presentation data in the requested presentation format;

presentation cache object having a plurality of cache entries, each cache entry corresponding to a presentation format; and object handler that,
in response to being invoked, instantiates the presentation cache object;
requests presentation data from the source object in a plurality of presentation formats;

in response to receiving presentation data from the source object in one of the requested plurality of presentation formats, stores the received presentation data in the cache entry corresponding to the presentation format of the received presentation data; and in response to receiving a request for presentation data in a specified presentation format, retrieves the stored presentation data from one of the plurality of cache entries that corresponds to the specified presentation format, so that the retrieved presentation data can be rendered to provide a representation of the source object.

30. The computer system of claim 29 wherein the presentation cache entries are stored on a persistent medium.

31. The computer system of claim 29 further comprising a client object that requests the object handler to cache presentation data in a plurality of presentation formats in the presentation cache object.

32. The computer system of claim 31 wherein the client object requests the object handler to update the presentation cache object on a specified basis.

33. The computer system of claim 32 wherein the specified basis includes a description of updating the presentation cache object from an object other than the source object.

34. The computer system of claim 32 wherein the specified basis is a frequency that controls how often the presentation cache object is updated.

35. A computer-readable memory medium containing instructions for controlling a computer processor to cache presentation data of a source object in a presentation cache object, the presentation data for rendering a representation of the source object, by performing the steps of:

requesting the source object to provide presentation data in a plurality of presentation formats;

receiving from the source object the requested presentation data in the plurality of presentation formats; and storing the received presentation data in the plurality of formats in the presentation cache object, wherein, when a request to retrieve data is received by the presentation cache object in a specified presentation format, the presentation data in the specified presentation format is retrieved from the presentation cache object and the retrieved presentation data is rendered to represent the source object;

wherein the computer-readable memory medium further comprising the steps of:
determining whether the source object is available for receiving requests;
when the source object is available for receiving requests, requesting from the source object presentation data in one of the plurality of formats; and
when the source object is unavailable for receiving requests, retrieving stored presentation data in the one of the plurality of formats from the presentation cache.

36. The computer-readable memory medium of claim 35, the source object having server code that implements the source object, wherein the source object is unavailable whenever the server code is not executing.

37. The computer-readable memory medium of claim 35 wherein the step of storing the received presentation data in the plurality of formats includes storing the presentation data in the plurality of formats on a persistent medium.

38. A computer-readable medium containing instructions for causing a computer system to cache for cache presentation data of a source object in a presentation cache object, by:

under control of the presentation cache object,
  requesting presentation data from the source object according to a specified data format and according to specified context characteristics;
  receiving from the source object the requested presentation data according to the specified data format and according to the specified context characteristics;
  storing the received presentation data in the presentation cache object; and
  upon receiving a request for presentation data in accordance with the specified data format and the specified context characteristics, retrieving the stored presentation data from the presentation cache object;
wherein the specified context characteristics include device information that is requested in the same request to the source object as the specified data format and wherein the step of receiving from the source object the requested presentation data receives presentation data arranged according to the device information;
wherein the specified context characteristics include view information and wherein the step of receiving from the source object the requested presentation data receives presentation data arranged according to the view information.

39. The computer-readable medium of claim 38 wherein the view information specifies that the requested presentation data is an icon.

40. The computer-readable medium of claim 38 wherein the view information specifies that the requested presentation data is a thumbnail sketch of the source object.

41. The computer-readable medium of claim 38 wherein the view information specifies that the requested presentation data is the contents of the source object.

42. The computer-readable medium of claim 38, the computer system having a printer, and wherein the view information specifies that the requested presentation data is formatted for printing on the printer.

43. The computer-readable medium of claim 38 wherein the specified context characteristics include an indication of a type of storage medium to transfer the presentation data and wherein the receiving of the requested presentation data from the source object receives presentation data arranged according to the type of storage medium indicated.

44. The computer-readable medium of claim 38 wherein the storing of the received presentation data in the presentation cache object stores the presentation data on a persistent medium.

* * * * *